(12) United States Patent
Bodinet

(10) Patent No.: US 8,085,292 B2
(45) Date of Patent: Dec. 27, 2011

(54) PROCESS AND SYSTEM USED TO DISCOVER AND EXPLOIT THE ILLUSORY DEPTH PROPERTIES INHERENT IN AN AUTOSTEREOSCOPIC IMAGE

(76) Inventor: Joshua Bodinet, San Diego, CA (US)

(*) Notice: Subject to any disclaimer, the term of this patent is extended or adjusted under 35 U.S.C. 154(b) by 1340 days.

(21) Appl. No.: 11/710,776

(22) Filed: Feb. 26, 2007

(65) Prior Publication Data

US 2008/0204547 A1 Aug. 28, 2008

(51) Int. Cl.
*H04N 15/00* (2006.01)
*H04N 13/02* (2006.01)

(52) U.S. Cl. .............. 348/46; 345/6; 345/419; 345/664; 382/194; 382/221; 382/299

(58) Field of Classification Search .................. 348/189, 348/222.1; 345/6, 32, 419, 427; 382/194
See application file for complete search history.

(56) References Cited

U.S. PATENT DOCUMENTS

| | | | |
|---|---|---|---|
| 5,059,771 A | 10/1991 | Ip et al. | |
| 5,204,944 A * | 4/1993 | Wolberg et al. | ............... 345/427 |
| 6,262,743 B1 | 7/2001 | Allio | |
| 6,850,210 B1 | 2/2005 | Lipton et al. | |
| 7,092,003 B1 | 8/2006 | Siegel et al. | |
| 2003/0067638 A1 | 4/2003 | Yano | |
| 2004/0246199 A1 * | 12/2004 | Ramian | ............................ 345/6 |
| 2006/0109202 A1 * | 5/2006 | Alden | ............................ 345/32 |

* cited by examiner

*Primary Examiner* — Dustin Nguyen
(74) *Attorney, Agent, or Firm* — Greer, Burns & Crain, Ltd.

(57) ABSTRACT

A method, system and devices for optimizing and/or maximizing the perceived autostereoscopic effect for any chosen combination of photographic or electronic recording materials, recording methods and parameters, and imaging methods and parameters. The method first determines the parameters characterizing the optimum autostereoscopic effect of the combination materials etc. (the front pixel spread and the back pixel spread), then specifies how to apply these parameters to the arrangement of image acquisition devices, or the production of images by computational means, to produce a final image with optimal autostereoscopic properties. Features of the present invention provide for image acquisition either occurring in the real world (via digital or analog means) or within a computer graphic environment (or a blend of both), by way of specific methods necessary for successfully traveling through a variety of different mathematical spaces to arrive at a common space.

16 Claims, 30 Drawing Sheets

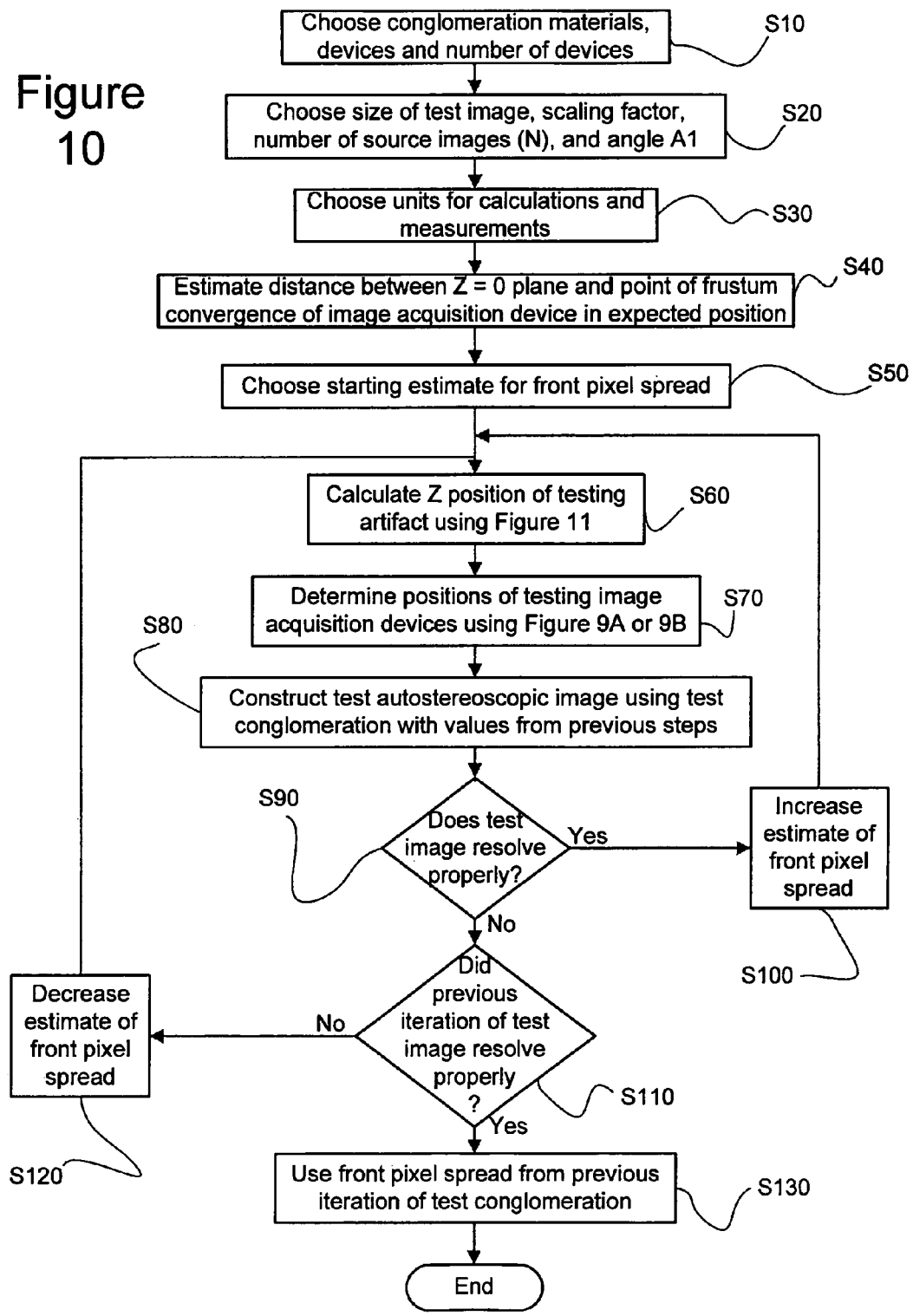

PROCESS AND SYSTEM USED TO DISCOVER AND EXPLOIT THE ILLUSORY DEPTH PROPERTIES INHERENT IN AN AUTOSTEREOSCOPIC IMAGE

The present invention relates generally to method used to determine the parameters necessary for increasing the perceived three-dimensional effect of an autostereoscopic image, and to a method of using those parameters, as well as to a system, or systems, of components for implementing the methods. More particularly, the present invention relates to a Discovery Phase, in which certain parameters for increasing the autostereoscopic effect are determined; an Exploitation Phase, in which those parameters determined in the discovery phase are used with image acquisition devices to create an autostereoscopic image; and to one or more systems of components for implementing the Discovery Phase and/or the Exploitation Phase.

Throughout this Specification, numerous terms of art will be used. In order to aid the reader with the understanding of this invention, the following definitions are provided (terms not defined below, or elsewhere in this Specification, should be considered as being defined by their ordinary meaning to one skilled in the art):

Actual Output Width—the width of the output image before any projective mapping has been applied to correct for perspective. This width is to be measured using the same units used to measure the front pixel spread and the back pixel spread, which are also the units used to express the native resolution of the output device and the related output device settings. autostereoscopic image—a group of items consisting of the physical components of a conglomeration and an interleaved subject image data file that has been transferred to a display surface, which is a component of the conglomeration. This interleaved subject image data file is to have been created in a fashion that encodes information capable of describing a three-dimensional image, given the proper viewing circumstances and an optical member through which this interleaved subject image is viewed, providing such viewing circumstances whereupon the information contained within the interleaved subject image data is decoded into information directly perceivable by an entity with binocular vision as a three-dimensional image. By way of the optical member, this decoding of the three-dimensional information encoded within the interleaved subject image occurs without the requirement that the entity with binocular vision wear or utilize any individual apparatus (such as special 3-d eyewear) for the purpose of experiencing the three-dimensional effect of the decoded information.

back bound of illusory space—the location in real space within a scene (on the Z axis, as shown in FIG. 4) that is to correspond to the location in illusory space inherent in the conglomeration that is to exist at the highest level of stereo perceivable behind the optical member, which is explicitly that area which appears to exist behind the physical materials of the autostereoscopic image when viewed by a viewer, once an autostereoscopic image is created of the scene using the conglomeration.

back pixel spread—(see FIG. 5) the maximum horizontal translation any dot, pixel, mark or grouping of such may undergo between any two successive interleave positions/indices (see FIG. 13) within an interleaved subject image data file where the dot, pixel, mark or grouping of such appears fully resolved and specifically not stuttered once the interleaved subject image data file is transferred to a display surface and viewed through an appropriately configured optical member. The optical units of the optical member extend in a vertical direction, perpendicular to the direction of the horizontal translation of the dot, pixel, mark or grouping of such. It is specifically noted that this horizontal translation relative to the back pixel spread is a translation in the direction necessary to produce an illusory three-dimensional effect/mark that appears behind the optical member (which is the area that appears to exist behind the physical materials of the autostereoscopic image when viewed by a viewer). The back pixel spread is measured using measurement units that correspond to the measurement units of the native resolution of the output device settings of the conglomeration for which the back pixel spread is being determined. For example, if the native resolution is measured in dots-per-inch then the back pixel spread is measured in inches.

conglomeration—a specific group of materials, output devices and output device settings used for the purpose of creating an autostereoscopic image.

discovery phase—the experimentation phase in which the front pixel spread and back pixel spread of a conglomeration are determined. Once values for the front pixel spread and back pixel spread are determined for a given conglomeration, a conglomeration of similar materials, output devices and output device settings will have identical front pixel spread and back pixel spread values.

exploitation phase—a phase where the values for the front pixel spread and back pixel spread determined in the Discovery Phase are used in conjunction with a set of environmental parameters, image acquisition device settings parameters, conglomeration parameters and the scaling factor to determine image acquisition device positions which optimizes the usage of the illusory three-dimensional space inherent in an autostereoscopic image created using the conglomeration for which the front pixel spread and back pixel spread were determined in the Discovery Phase. The optimization may be theoretical, or non-theoretical. Non-theoretical usage of the illusory three-dimensional space creates an autostereoscopic image in which the visual components of the image exist at a level of stereo that is less than or equal to the level of stereo at which the visual components would exist under a theoretical maximization of the usage of said illusory space.

front bound of illusory space—the location in real space within a scene (on the Z axis, as shown in FIG. 4) that is to correspond to the location in illusory space inherent in the conglomeration that is to exist at the highest level of stereo perceivable in front of the optical member, which is explicitly that area which appears to between a viewer and the physical materials of the autostereoscopic image, once an autostereoscopic image is created of the scene using said conglomeration.

front pixel spread—(see FIG. 6) the maximum horizontal translation any dot, pixel, mark or grouping of such may undergo between any two successive interleave positions/indices (see FIG. 13) within the interleaved subject image data file where the dot, pixel, mark or grouping of such appears fully resolved and specifically not stuttered once the interleaved subject image data file is transferred to a display surface and viewed through an appropriately configured optical member. The optical units of the optical member extend in a vertical direction, perpendicular to the direction of the horizontal translation of the dot, pixel, mark or grouping of such. It is specifically noted that the horizontal translation relative to the front pixel spread is a translation in the direction necessary to produce an illusory three-dimensional effect/mark viewable in front of the optical member (which is the area that appears to exist between a viewer and the physical materials of the autostereoscopic image). The front pixel spread is measured using the same measurement units that correspond to the measurement units of the native resolution of the output device settings of the conglomeration for which the front pixel spread is being determined. For example, if the native resolution is measured in dots-per-inch then the front pixel spread is measured in inches.

image acquisition device—an actual camera of some variety existing in the real world or an abstraction of a camera of some variety existing within a computer graphic application/environment.

image acquisition device settings—the vertical and horizontal field of view measurements of the frustum of the image acquisition device(s), along with the pixel dimensions of the source imagery acquired by the image acquisition device(s) once this source imagery exists as pixels contained within a data file. Thus, if the image acquisition device(s) capture(s) images on film, the consistent pixel dimensions to which a frame of such film is scanned are the respective pixel dimensions. Note that when there is a plurality of image acquisition devices being used to acquire the source imagery, it is highly preferred that all of the image acquisition devices share the same image acquisition device settings.

interleaved—a single, discrete subject image data file is said to be interleaved if it consists of a subset of proper sections of a set of source images whereupon the pixels of the set of source images have either been directly manipulated so as encode the effect of parallax or acquired using an image acquisition device (or grouping of such devices) set at positions in space conducive to collect data useable for encoding the effect of parallax. Once the pixels of the sets of source images have been directly manipulated or acquired using an image acquisition device or devices (and if acquired using an image acquisition device or devices, the source images have also been subjected to projective mapping for the purpose of correcting for perspective as necessary), those pixels which are to be transferred to the subject image data file are passed through a series of binary masks (see FIG. 13) in such a way that the multiplicity of sequenced source images become compiled into the interleaved subject image data file with the encoded effect of parallax of each such source image remaining intact. Once this interleaved subject image data file is transferred to a display surface and viewed through an appropriately configured optical member, the interleaved subject image data file is able to be decoded back into the appearance of a multiplicity of source images, with each discrete source image being viewable from a one or more different viewing positions relative to the resultant autostereoscopic image. Preferably, each discrete source image is viewable from a number of different viewing positions relative to the resultant autostereoscopic image, with the sequence of discrete source images repeating periodically. The ability of the combination of the interleaved subject image data file once transferred to the display surface and the optical member, through which the interleaved subject image data file is viewed, to decode this multiplicity of source imagery discretely when the resultant autostereoscopic image is viewed from different positions in space is the cause of the autostereoscopic effect. Known methods of interleaving a multiplicity of source images into an interleaved subject image data file are sufficient for the purpose of this invention. A specific concept embodied within such standard interleaving methods to be here noted is the concept that if the frequency of the optical units of the optical member is $D$ (as measured in linear units, such as 40 lenticules per inch regarding a lenticular screen), the native resolution of the output device and output device settings is $R$, and the number of interleave positions/indices is an integer value $N$ in which $N=R/D$, where $R/D$ is rounded up/down to be an integer value using a standard rounding scheme. Upon completion of the interleave of the subject image data file, the subject image data file is then scaled by $(R/D)/N$, where all values are here treated as floating point values, with the case of $(R/D)/N$ yielding a value of 1.0 being trivial.

materials—one of the following definitions apply, depending upon the medium of the autostereoscopic image: (1) if the autostereoscopic image is to be created by transferring an interleaved subject image data file to a display surface consisting of a material accepting of dyes, inks, paints, pigments or of chemical exposure, light exposure or radiation exposure, the term materials refers to the display surface, the dyes, inks, paints, etc., and to the specific optical member used to generate the illusory three-dimensional effect; (2) if the autostereoscopic image is to be created by transferring an interleaved subject image data file to computer, television or other type of monitor, the term materials refers to the computer, television or other type of monitor, and the optical member used to generate the illusory three-dimensional effect.

native resolution—the pixel resolution/density to which an arbitrary image data file is scaled by the paired set of an output device and its output device settings prior to the output device transferring the arbitrary image data file to a display surface, as well as to any resolution which is a "twos multiple" or "twos factor" of the pixel resolution/density. The following are examples of "twos multiples:" 720 is a twos multiple of 360 (i.e., 360×2=720) and 1440 is a twos multiple of 360 (i.e., 360×2×2=1440). The following are examples of 'twos factors:" 180 is a twos factor of 360 (i.e., 360/2=180) and 90 is a twos factor of 360 (i.e., 360/(2×2)=90). It is possible that when a resolution of such a twos multiple of the native resolution is used, the resultant autostereoscopic image may be of greater quality.

non-theoretical usage—any usage of the illusory three-dimensional space inherent to a conglomeration in which the visual components appearing in the autostereoscopic image produced using this conglomeration appear at a level of stereo that is less than or equal to the theoretical maximization of the illusory three-dimensional space inherent to the conglomeration.

N—see the definition of the term "interleaved" for an explanation of the parameter N.

optical member—either a parallax barrier or a lenticular screen. The usage of either a parallax barrier or a lenticular screen in the preparation and production of a discrete autostereoscopic image is mutually exclusive. An optical member has specifically designed and positioned optical units that provide for the decoding of properly encoded three-dimensional information.

optical unit—one of the following definitions apply, depending upon the class of optical member involved: (1) if the optical member is a parallax barrier, the optical unit is one individual vertical aperture of which there are potentially a plurality of such optical units within a particular optical member. The optical units of a parallax barrier visualized in FIG. 13 are the discrete vertical white stripes of the parallax barrier which specifically exist at the index of 0 in the interleave positions/indices illustrated within the diagram. (2) if the optical member is a lenticular screen, the optical unit is one individual vertical lenticule (lens) of which there are potentially a plurality of such optical units within a particular optical member.

output devices—one of the following definitions apply, depending upon the type of autostereoscopic image: (1) if the autostereoscopic image is to be created by transferring an interleaved subject image data file to a display surface where the display surface consists of a material accepting of dyes, inks, paints, pigments or of chemical exposure, light exposure or radiation exposure, the term output devices refers to the printing or imaging device responsible for transferring the interleaved subject image data file to the display surface and the component software/hardware driving said device; or (2) if the autostereoscopic image is to be created by transferring an interleaved subject image data file to computer, television or other type of monitor, the term output devices refers to the computer, television or other type of monitor and the associated software and/or hardware driving the monitor.

output device settings—any and all nontrivial settings or values used to drive or control the output device during the transferal of the interleaved subject image data file to the display surface. The term output device settings also refers to the resolution or pixel density of the interleaved subject image data file being transferred to the display surface using the output device as measured in inches, centimeters or any other arbitrary unit (e.g., 600 dots-per-inch, 360 pixels-per-centimeter). This resolution or pixel density is the native resolution of the output device and output device settings.

scaling factor—if it is the case that the source imagery acquired by the image acquisition device(s) is of insufficient pixel size to produce the interleaved subject image data file, in the native resolution, necessary to produce the desired autostereoscopic image at the desired size and composition/cropping, a scaling factor is determined by which the source imagery will be scaled prior to interleave into the subject image data file.

similar—materials are said to be similar when originating from the same manufacturer and when existing under the same model name/number and when existing from the same lot. Materials are also deemed to be similar when generated to the same specifications, by the same or different manufacturers. Output devices are said to be similar when originating from the same manufacturer and when existing under the same model name/number. Output devices are also deemed to be similar when generated to the same specifications, by the same or different manufacturers. Output device settings are said to be similar when two such settings are identical. Conglomerations are said to be similar if they contain similar materials, similar output devices and similar output device settings.

theoretical maximization—the case where all of the visual components of an autostereoscopic image exist as a group at the highest level of stereo possible for the conglomeration of which it has been produced without any one such visual component of the group appearing visually stuttered or jagged due the visual component existing in illusory space that exists beyond the bound of resolvable illusory three-dimensional space inherent to the particular conglomeration.

vector of the image acquisition device—(see FIG. 3) the vector that emanates from the point of frustum convergence of the image acquisition device, pointing in the direction which bisects both the horizontal and vertical fields of view of the frustum of the image acquisition device. The heading rotation component of the image acquisition device positioning is to be such that the vector of the image acquisition device is always pointing to the X, Z origin (i.e., where $(X, Z)=(0, 0)$) of the subspace in which the image acquisition devices reside. This specifically includes the vector of the image acquisition device pointing at (0,0), even after any positional alteration of the respective image acquisition device due to an inverse scaling.

Z=0 plane—the plane in real world space which is to represent the space comprised of the actual, physical autostereoscopic image; meaning that space which is not in front of the actual, physical autostereoscopic image in illusory space or behind the actual, physical autostereoscopic image in illusory space, but rather that space within the bounds of the illusory space which shares the selfsame space as the material of the actual, physical autostereoscopic image itself.

BACKGROUND OF THE INVENTION

In general, autostereoscopic displays provide a viewer with a three-dimensional display without the use of special glasses, goggles, or other specialized viewing aids. One type of autostereoscopic display, known as a parallax display with a lenticular screen (which is one type of parallax barrier), includes a viewing surface, or screen, that is covered with display elements, such a vertically extending lenticules (or lenses) and an interleaved image on a display surface (such as a computer screen or a print on paper, Bristol board or other medium). The lenticules are specifically designed to emit light of varying intensity in different directions, such as by being convexly-shaped.

When creating an autostereoscopic display, it is known to acquire a plurality of source images from a plurality of positions in space using a single image acquisition device repeatedly, or a plurality of such devices, resulting in a set of sequential source images (i.e., multi-viewpoint photography). It is also known to combine these source images into a single interleaved subject image data file, where the interleaved subject image data file is encoded with a parallax effect that is able to be decoded after the data file has been transferred to a display surface and viewed through a properly configured optical member.

The following prior art references provide general background information regarding the creation of an autostereoscopic image: (a) United States Patent Application Publication No. 2003/0067638 to Kotaro Yano; (b) U.S. Pat. No. 7,092,003 to Siegel et al. and (c) U.S. Pat. No. 6,850,210 to Lipton et al. These prior art references provide information usable in generating an autostereoscopic image of high quality. However, an important notion lacking from these references is that creating a predictable and controllable level of stereo apparent in such an autostereoscopic image is directly dependent upon the precise positional relationship between subject matter of the source image and the image acquisition device(s); the specific image acquisition device settings; and a scaling factor imposed on the source images prior to the combination of said source images into the interleaved subject image data file used to create the autostereoscopic image. Autostereoscopic images created without proper attention to these factors can result in the visual components appearing stuttered, jagged or otherwise dissipated. Without a well-defined process by which image acquisition device positions are determined, results with regard to the usage of the illusory three-dimensional depth of an autostereoscopic image (that is, the level of stereo) are left to trial-and-error, hypothesis or chance, as opposed to intention.

U.S. Pat. No. 6,262,743 to Pierre Allio (hereinafter "the Allio patent") discloses one method of intentional controlling the level of stereo apparent in an autostereoscopic image through specific positioning of image acquisition devices. However, the invention described in the Allio patent only relates to the generation of an autostereoscopic image displayed on a screen using video images, and does not relate to images created using other materials/devices (such as paper, ink and printers). The Allio patent focuses primarily on autostereoscopic images created using images generated from a three-dimensional database, leaving out considerations necessary when acquiring images using actual cameras in a real world setting.

BRIEF SUMMARY OF THE INVENTION

Briefly, the present invention relates to a method for optimizing and/or maximizing the perceived autostereoscopic effect for any chosen combination of photographic or electronic recording materials, recording methods and parameters, and imaging methods and parameters, regardless of whether a lenticular array or a parallax barrier screen is used. The method first determines the parameters characterizing the optimum autostereoscopic effect of the combination materials etc., then specifies how to apply these parameters to the arrangement of image acquisition devices, or the production of images by computational means, to produce a final image with optimal autostereoscopic properties.

One aspect of the invention is, thus, a method for setting up an arrangement of objects and image acquisition devices in order to acquire a set of photographs, or computer generated images, to be used in the testing of the autostereoscopic properties of a combination of materials etc. to be used to produce an autostereoscopic image. The autostereoscopic image produced from this test is examined to determine parameters to be used in image acquisition device positioning which will yield good-quality/maximized results in practical situations.

One of the objects of the present invention is to address the shortcomings of the prior art by providing a means to determine image acquisition device positioning that will theoretically maximize and non-theoretically utilize the inherent resolvable illusory three-dimensional depth properties of an autostereoscopic image. The autostereoscopic image will be created using a specific conglomeration for which values for certain parameters, here deemed the front pixel spread and the back pixel spread, have been determined by way of successfully completing the Discovery Phase sub-process of the present invention. Using this information determined in the Discovery Phase, and information gathered from the image acquisition environment and image output environment, a specific set of data related to image acquisition device positioning is calculated and presented in the Exploitation Phase sub-process of the invention. It is the intention of this invention that this specific set of data calculated and presented in the Exploitation Phase is the information to be used to precisely position image acquisition device(s), ensuring that source images acquired from the calculated positions are able to be interleaved into a subject image date file that is capable of producing an autostereoscopic image of which the illusory three-dimensional space is theoretically maximized and/or non-theoretically utilized.

Another object of the present invention is to address the shortcomings of the prior art methods of creating autostereoscopic images. Certain features of this invention provide for the calculation of the positioning of image acquisition device (s) used in creating autostereoscopic imagery using a wide variety of conglomerations and image acquisition devices. The methods of the present invention do not to impose external restrictions on the positioning of the image acquisition devices, but rather leave such positioning solely to be determined within the actions of the process. Aspects of the present invention provides specific methods for handling cases where the scaling factor to be imposed on source imagery prior to interleave is non-trivial through the alteration of image acquisition device positioning.

The present invention provides for two metrics, the front pixel spread and the back pixel spread, which allow for precise image acquisition positioning in circumstances physically and conceptually far removed from the conglomeration being used to generate the resultant autostereoscopic image, as well as an ergonomically-friendly process by which values for these two metrics are determined. Features of the present invention provide for image acquisition either occurring in the real world (via digital or analog means) or within a computer graphic environment (or a blend of both), by way of specific methods necessary for successfully traveling through a variety of different mathematical spaces to arrive at a common space. Finally, the present invention provides a variety of methods by which image acquisition device positioning is able to be computed, a class of which allows for greater accuracy.

More specifically, the present invention provides a method of creating an autostereoscopic image including the steps of: determining a value of a front pixel spread; determining a value of a back pixel spread; determining N different positions for an image acquisition device, or devices, based, at least in part, on the values of the front pixel spread and the back pixel spread; acquiring N source images using the image acquisition device, or devices, positioned at the N different positions; and interleaving the N source images to create an autostereoscopic image.

One embodiment of the method of determining a front or back pixel spread for use in creating an autostereoscopic image includes the following steps: Determining angle A1 based on the following formula: $A1=M/N-1$, where M is a value between 0° and 180° and N is the number of different positions for the image acquisition devices. Determining an arbitrary Z measurement; Determining an arbitrary starting estimate of the pixel spread. Calculating a Z axis position of a testing artifact based on N, the current estimate of the pixel spread, the arbitrary Z measurement, and angle A1. Determining the N different positions of one or more image acquisition devices based on N, angle A1 and the current calculated Z axis position of the testing artifact. Creating a test autostereoscopic image of a testing artifact positioned at the current calculated Z axis position with one or more image acquisition devices at the determined N different positions. Judging whether the current test autostereoscopic image resolved properly, wherein if the current test autostereoscopic image resolved properly, the current estimate of the pixel spread is increased, and the process repeats the steps of calculating a Z axis position, determining the N different positions, creating a test autostereoscopic image, and judging the current autostereoscopic image. However, if the current test autostereoscopic image did not resolve properly, the process continues by recollecting whether the previous autostereoscopic image resolved properly, and if the previous autostereoscopic image resolved properly, the method is terminated and the associated previous estimate of the pixel spread is relied upon as the final pixel spread. But if the previous autostereoscopic image did no resolve properly, the current estimate of the pixel spread is decreased, and the process repeats the steps of calculating a Z axis position, determining the N different positions, creating a test autostereoscopic image, and judging the current autostereoscopic image. And, finally conveying to a user the final pixel spread from the judging step.

An alternate embodiment of a method of determining a pixel spread for use in creating an autostereoscopic image using a computer includes the following steps. Creating a blank image data file, and then generating a binary mask of pixel dimensions that correspond to the blank image data file. Generating a testing artifact. Determining an arbitrary starting estimate of the pixel spread. Passing the testing artifact through a plurality of predetermined passing sections of the binary mask, and storing the resulting image data in the image data file. Horizontally shifting the predetermined passing sections of the binary mask one index value. Horizontally shifting the testing artifact, relative to the binary mask, by an amount equal to one index value multiplied by the current estimate of the front or back pixel spread. Passing the testing artifact through the current predetermined passing sections of the binary mask, and storing the resulting image data in the image data file. Judging whether all of the index values have acted as a predetermined passing section, and if not, repeating the steps of horizontally shifting the predetermined passing sections, horizontally shifting the testing artifact, and passing the testing artifact until all of the index values have acted as a predetermined passing section. Creating a test autostereoscopic image of the testing artifact from the plurality of resulting stored image data in the image data file. Judging whether the current test autostereoscopic image resolved properly. If the current test autostereoscopic image resolved properly, the current estimate of the pixel spread is increased, and the process repeats the steps of passing the testing artifact, horizontally shifting the predetermined passing sections, horizontally shifting the testing artifact, and passing the testing artifact until all of the index values have acted as a predetermined passing section. On the other hand, if the current test autostereoscopic image did not resolve properly, recollecting whether the previous autostereoscopic image resolved properly, and if the previous autostereoscopic image resolved properly, ending the method and relying on the associated previous estimate of the pixel spread as the final pixel spread. However, if the previous autostereoscopic image did no resolve properly, the current estimate of the pixel spread is decreased, and the process repeats the steps of passing the testing artifact, horizontally shifting the predetermined passing sections, horizontally shifting the testing artifact, and passing the testing artifact until all of the index values have acted as a predetermined passing section. Finally, conveying to a user the final pixel spread from the judging step.

One embodiment of a method of using a front pixel spread and a back pixel spread to determine positions for at least one image acquisition device to be used in creating an autostereoscopic image includes the following steps. Receiving values of the front and back pixel spreads. Positioning a single image acquisition device to compose the overall scene. Measuring the distance (D) of the vector from the point of frustum convergence of the image acquisition device to the Z=0 plane; measuring the distance (F) from the Z=0 plane to the front bound of the illusory space; measuring the distance (B) from the Z=0 plane to the back bound of the illusory space. Then, calculating a central angle between positions of image acquisition devices, relative to a point of intersection of the vector from the point of frustum convergence to the Z=0 plane, using distance D, distance F and distance B. Then determining N different positions for the image acquisition device, or devices, based on either the calculated central angle or an angle of lesser value than the calculated central angle. Acquiring N source images using the image acquisition device, or devices, positioned at the N different positions. Finally, interleaving the N source images to create an autostereoscopic image.

BRIEF DESCRIPTION OF THE SEVERAL VIEWS OF THE DRAWINGS

Preferred embodiments of the present invention are described herein with reference to the drawings wherein:

FIG. 10 is a flow chart for explaining the process steps of the Discovery Phase, as used to determine the front pixel spread.

DETAILED DESCRIPTION OF THE INVENTION

As mentioned previously, one of the objects of the present invention is to provide a method of systematically determining certain parameters for the creation of an autostereoscopic image, so that the illusory three-dimensional space created in the image is optimized. In the preferred embodiment, the method includes two main phases—a Discovery Phase and an Exploitation Phase. During the Discovery Phase, as explained in more detail below, certain parameters are determined using a test image. In the Exploitation Phase, the parameters determined are utilized in creating the desired autostereoscopic image.

Figure 1:
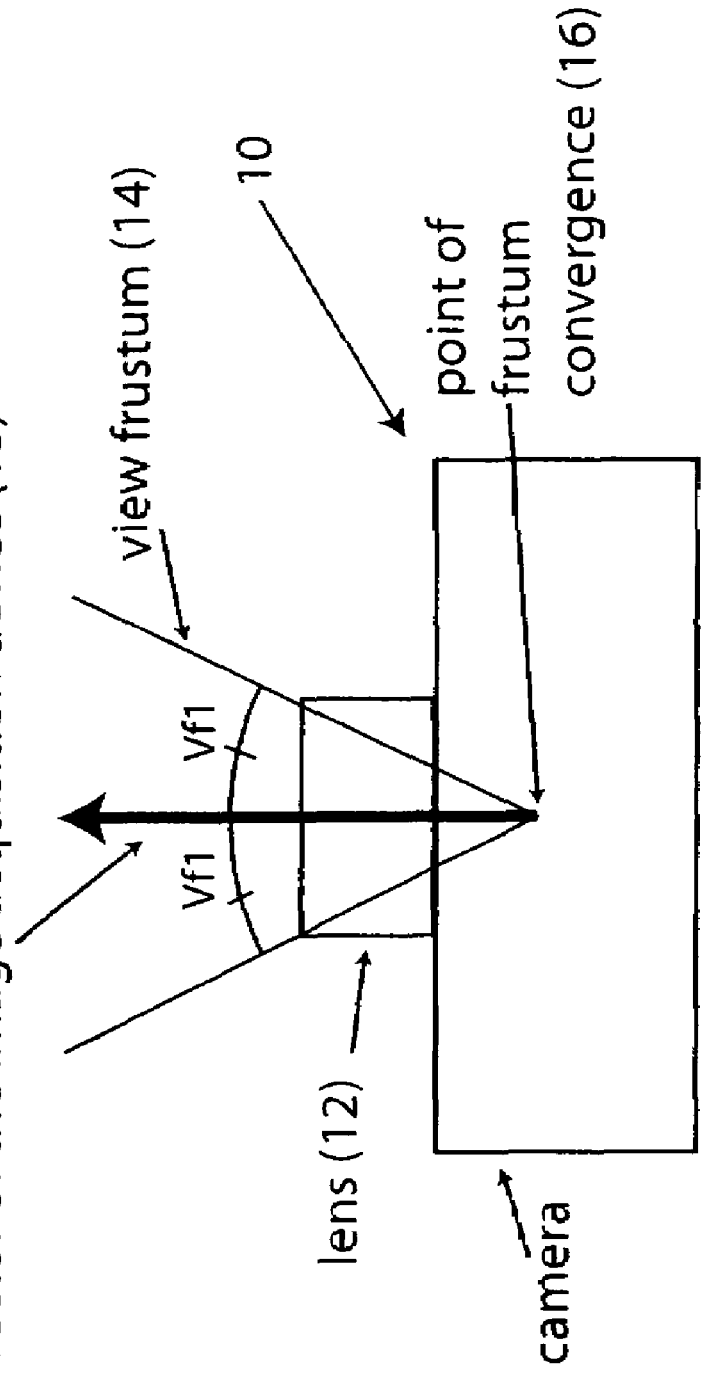
FIG. 1 is a diagram showing a schematic top view of an image acquisition device, for explaining the frustum of the image acquisition device, the point of frustum convergence and the vector of the image acquisition device.
Figure 2:
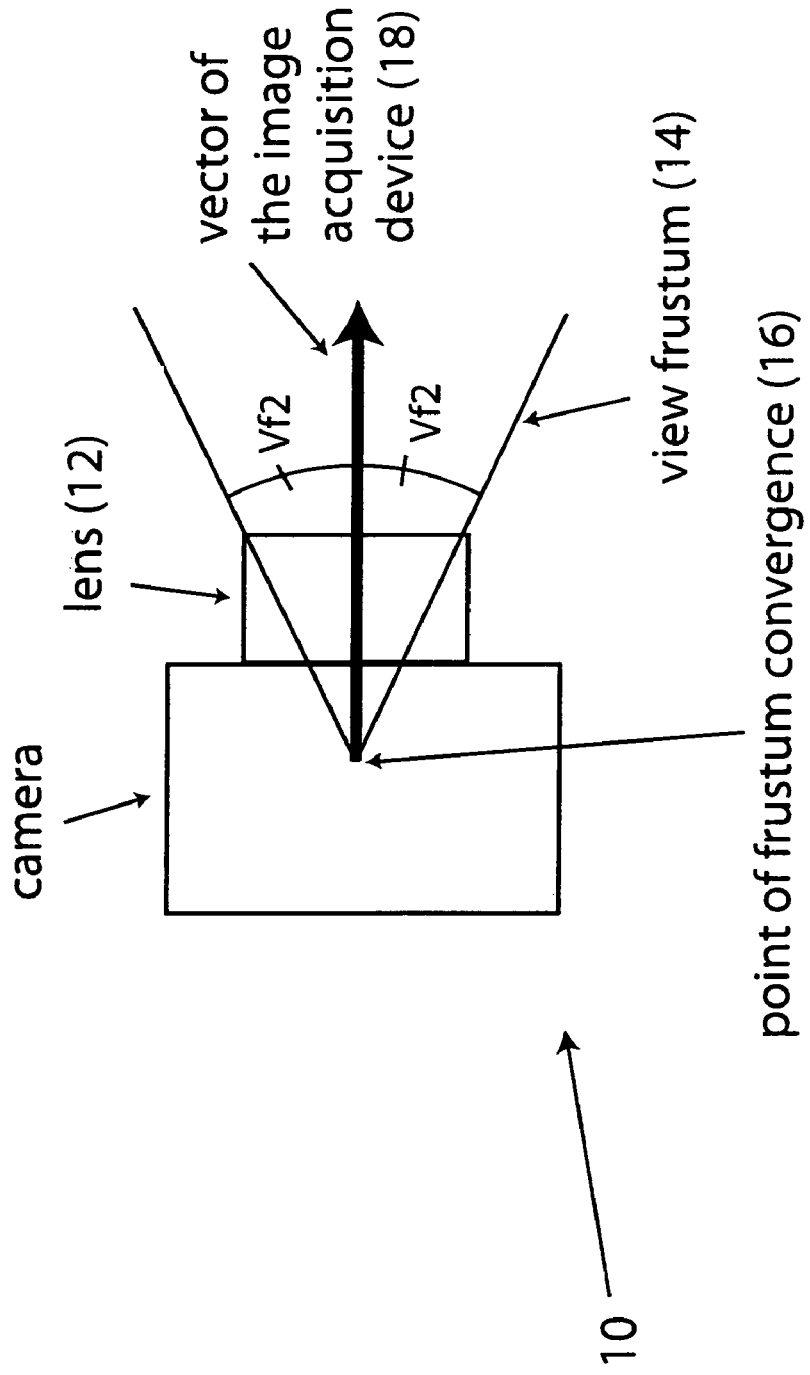
FIG. 2 is a diagram showing a schematic side view of an image acquisition device, for explaining the frustum of the image acquisition device, the point of frustum convergence and the vector of the image acquisition device.
Figure 3:
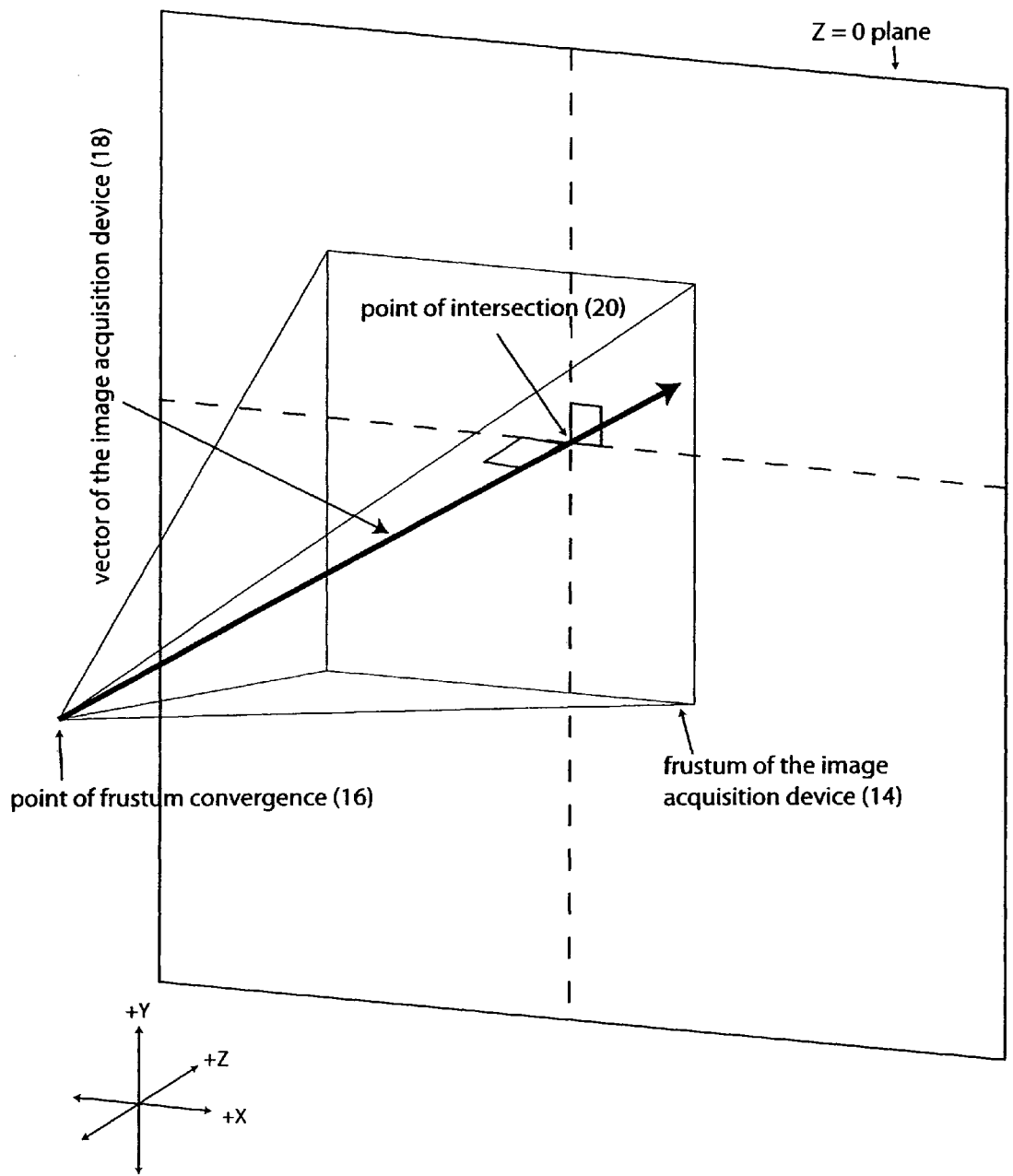
FIG. 3 is a diagram visually explaining the intersection of the vector of the image acquisition device and the plane which is to be the Z=0 plane.

Prior to beginning the explanation of the Discovery Phase and the Exploitation Phase, certain features of image acquisition devices and autostereoscopic images will be discussed. Turning now to FIGS. 1 and 2, these figures schematically show a top view (FIG. 1) and a side view (FIG. 2) of an image acquisition device 10. Image acquisition device 10 may be an actual camera of any type (digital or film), or it may be an abstraction of a camera that exists only within a computer graphic application. Regardless of which type of image acquisition device 10 is being used, it will include some form of real or virtual lens 12, which defines a viewing frustum 14, which frustum is also shown in FIG. 3. As can be seen in FIGS. 1-3, there is a point of frustum convergence 16, which will generally be behind the lens 12. From the point of frustum convergence 16 emanates a vector 18 that defines a point of intersection 20 with the Z=0 plane.

Figure 4:
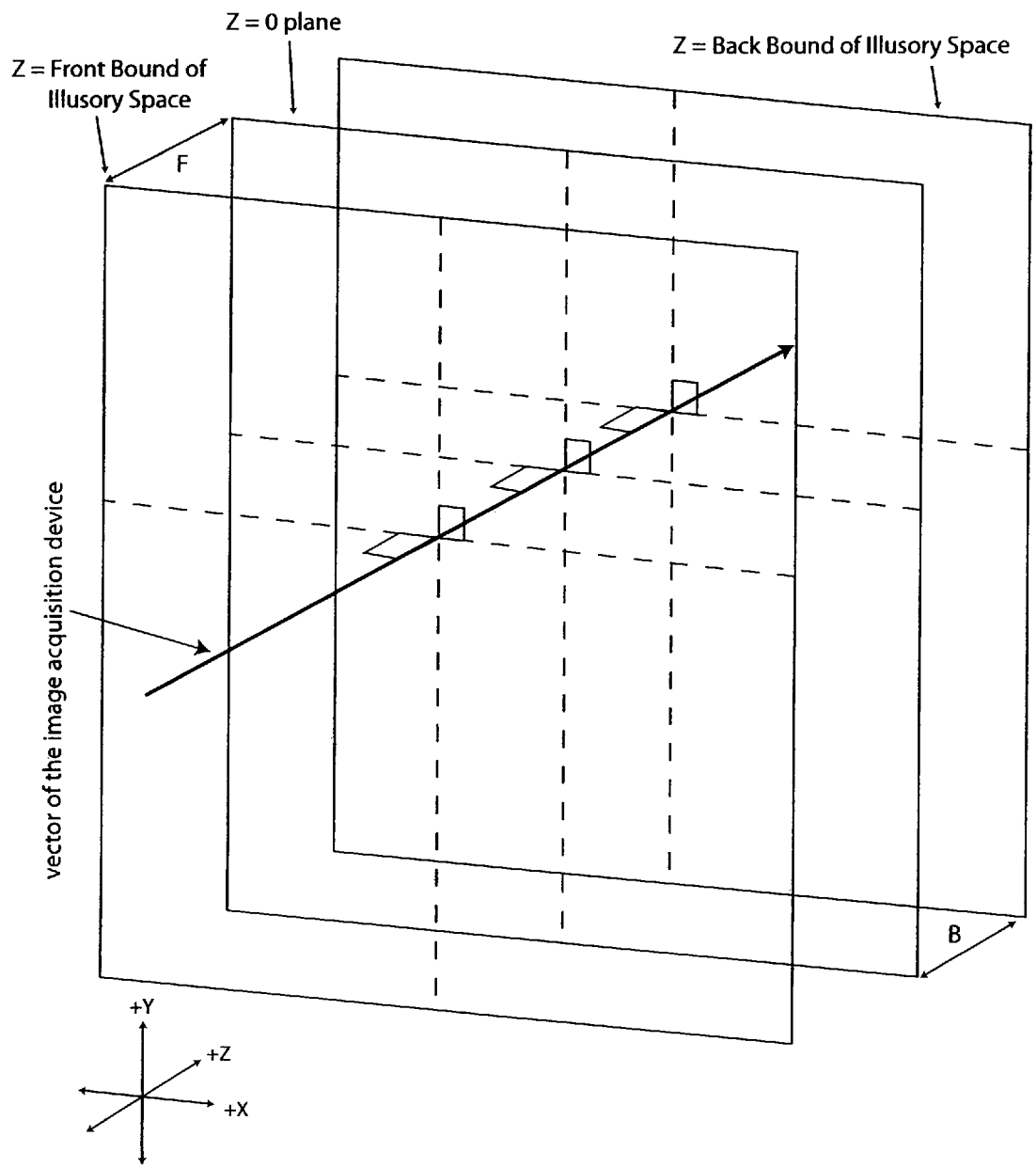
FIG. 4 is a diagram visually explaining the relationship between the Z=0 plane, the Z=front bound of illusory space plane, the Z=back bound of illusory space plane and the vector of the image acquisition device.

Turning now to FIG. 4, which is a schematic of an optical member for displaying an autostereoscopic image (such as lenticular screen), the Z=0 plane can be seen. The Z=0 plane is located somewhere between the back bound of the illusory space (the plane behind the physical materials of the optical member that is the rear boundary of the illusory image) and the front bound of illusory space (the plane in front of the physical materials of the optical member that is the front boundary of the illusory image). As can be seen in FIG. 4, the vector 18 of the image acquisition device is normal to the Z=0 plane, the back bound of illusory space, and the front bound of illusory space. It should be noted that the front and back bounds for a particular conglomeration (i.e., a specific group of materials, output devices and output device settings used for creating an autostereoscopic image) are fixed, but FIG. 4 can also be used to determine the front and back bounds for a particular scene, in which case these parameters are variable. One of the features of the present invention is to map the variable front and back bounds of a particular scene to the fixed front and back bounds of a particular conglomeration.

The view frustum 14 of FIGS. 1 and 2 also defines a set of angles. More specifically, FIG. 1 shows angles $V_{F1}$, which are the angles of the horizontal field of view created between the view frustum 14 and the vector 18. Basically, vector 18 bisects the horizontal field of view, so two times angle $V_{F1}$ equals the total horizontal field of view. Angles $V_{F2}$ of FIG. 2 relate to the vertical field of view, where angles $V_{F2}$ are formed between vector 18 and the view frustum 14. Similar to the horizontal field of view of FIG. 1, in the vertical field of view of FIG. 2, vector 18 bisects the vertical field of view, so two times angle $V_{F2}$ equals the total vertical field of view.

It should be noted that, in both the Discovery Phase and the Exploitation Phase, when dealing with positions, measurements and pixel spreads in three-dimensional space, all such values must be converted into common units. The common units used in this Specification are true pixel units. However, during the actual usage of the invention, any common unit may be used, such as an arbitrarily chosen world unit (such as inches or centimeters), as long as the schemes used to covert between any two arbitrary spaces properly convert all individual units to this common unit per the associations used in this portion of the description of the invention. True pixel units rely upon the pixel as the common unit of measure in the fashion in which this pixel relates to the interleaved subject image data file.

The conversion of positions and measurements valued in arbitrary world units to true pixel units is as follows, occurring in any suitable order. Determine the vertical field of view angle measure (VFOV) of the frustum of the image acquisition device in the desired image acquisition device settings state to be used during actual image acquisition. Determine the pixel height (pixheight) of the source image (which is a component of the image acquisition device settings state). With the image acquisition device (in the image acquisition device settings state) positioned relative to a scene so as to capture an image of a desired visual composition, as shown in FIG. 3, take a measurement (in the desired arbitrary world units) FROM the point in space that is the intersection of the vector of the image acquisition device and the plane which is to be the Z=0 plane in the autostereoscopic image TO the point of frustum convergence of the image acquisition device. In other words, determine the distance between point 16 and point 20, along line 18, of FIG. 3. Identify this value as Zwu. Evaluate the following equation to find the true pixel unit per world unit conversion factor, here labeled TPperWU:

$$TPperWU = ((0.5*pixHeight)/\tan(0.5*VFOV))/Zwu \qquad \text{(Equation 1)}$$

It should be noted that this conversion factor is only relevant with the given image acquisition device in the given image acquisition device settings state, in the given position relative to the Z=0 plane measured using the chosen world unit. Any alteration of these parameters requires a new calculation of the TPperWU conversion factor.

Figure 5:
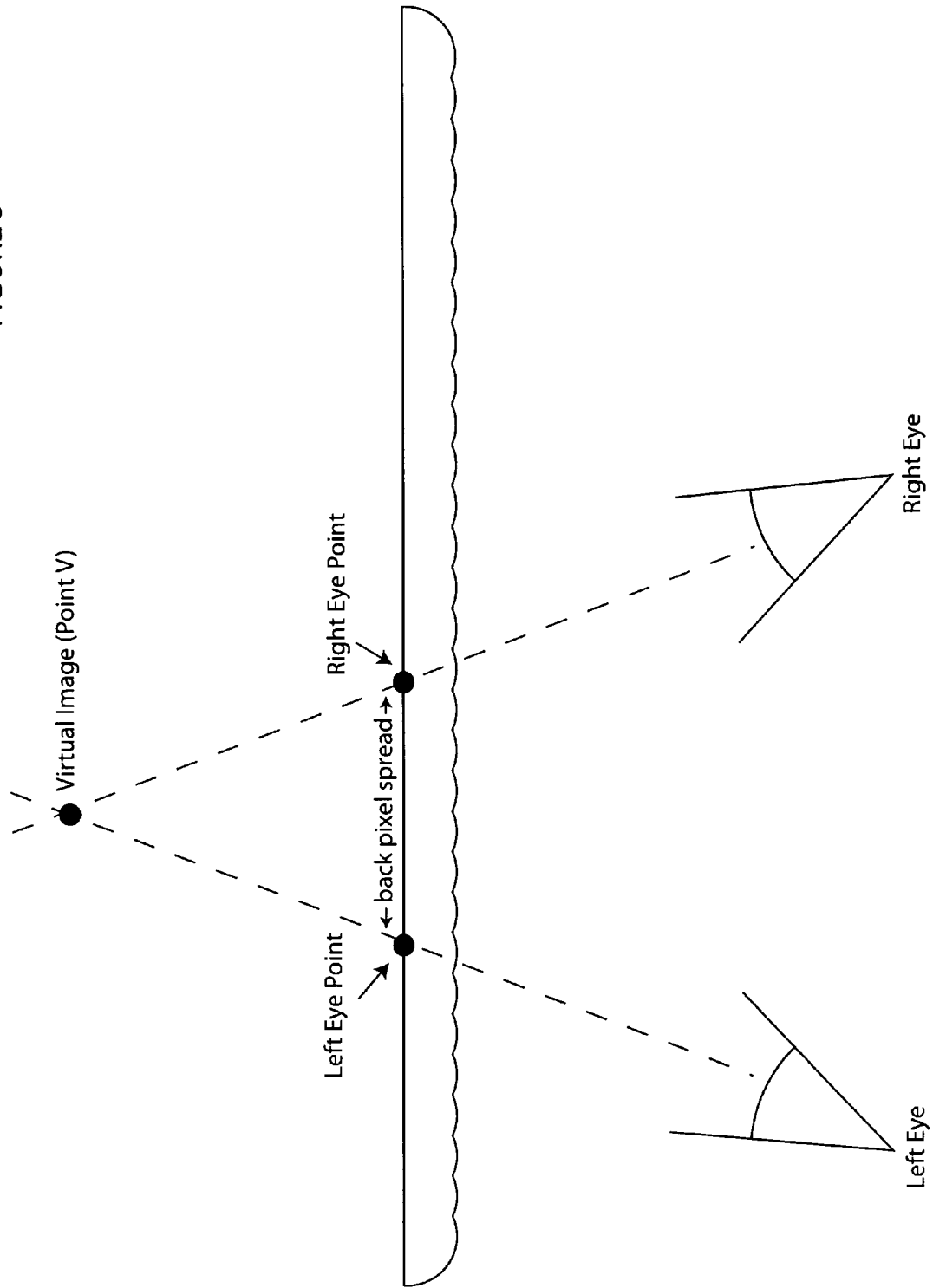
FIG. 5 is a diagram visually explaining, in a generic fashion, the concept of a back pixel spread and how this concept fits in with the creation of the illusory (virtual) image.

Turning now to FIG. 5, the concept of the back pixel spread will be explained. FIG. 5 includes an optical member, such as lenticular screen 22, and it demonstrates how the left and right eye points of the actual interleaved print or computer screen combine to form a single virtual image (point V), where point V is a virtual image that appears to float behind the optical member 22. As can be seen in FIG. 5, the back pixel spread is the linear distance on the plane of the interleaved print or computer screen (or other imaging device) located behind the optical member 22, and it extends between the left eye point and the right eye point. Preferably, the plane of the interleaved print or computer screen will be essentially co-planar with the plane of the back of the optical member 22. The back pixel spread is an important parameter because it represents the maximum horizontal distance that any portion of the virtual image, as the virtual image appears to be contacting the back surface of optical member 22, may be horizontally shifted, in the autostereoscopic image, before the image appears to be stuttered or jagged.

Figure 6:
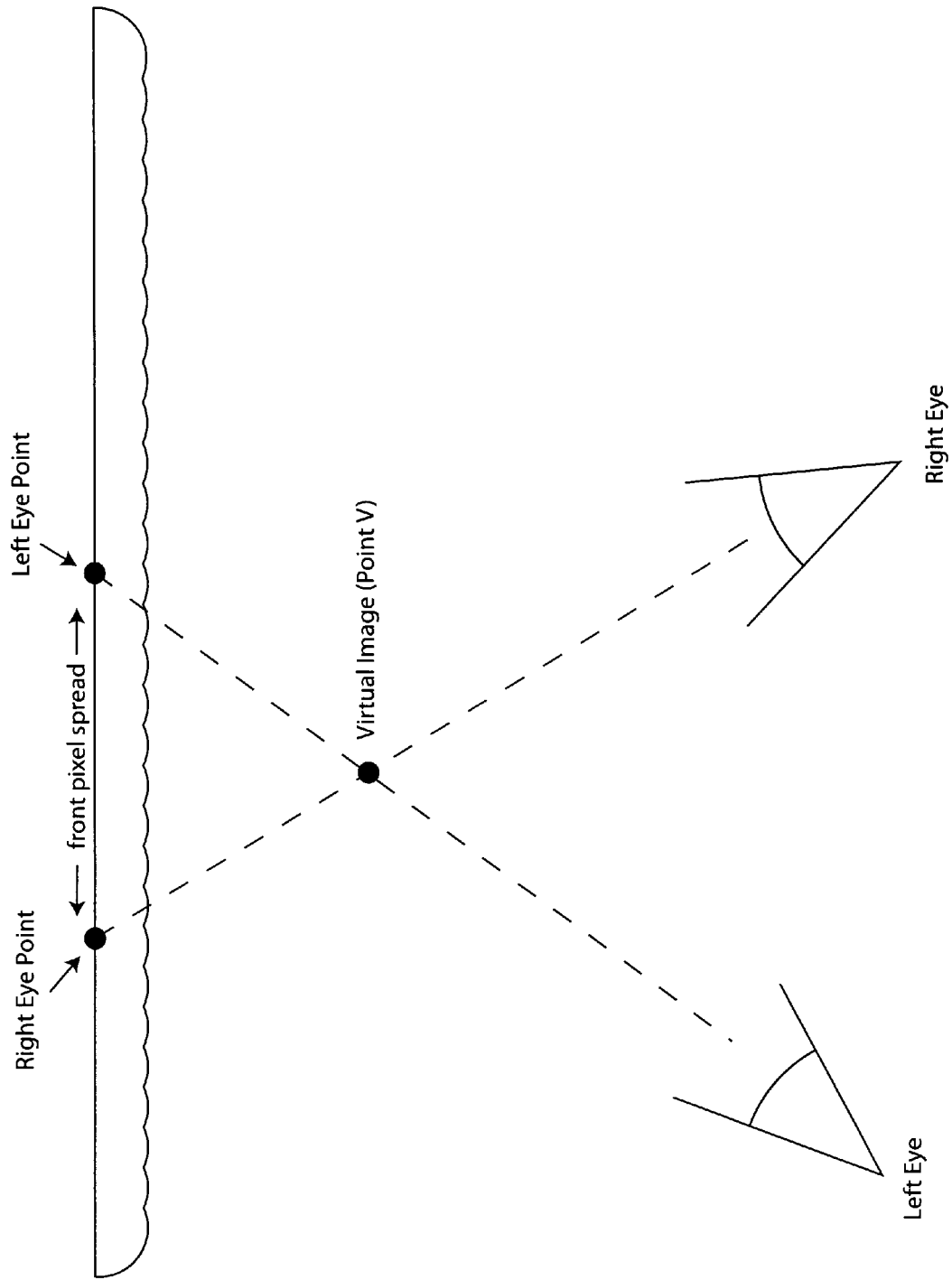
FIG. 6 is a diagram visually explaining, in a generic fashion, the concept of a front pixel spread and how this concept fits in with the creation of the illusory (virtual) image.

FIG. 6 demonstrates the concept of the front pixel spread, which is similar to the concept of back pixel spread, except this time the virtual image (still referred to as point V) is located in front of the optical member 22 (instead of in back of the optical member 22, as in FIG. 5). Similar to the back pixel spread, the front pixel spread is another important parameter because it represents the maximum horizontal distance that any portion of the virtual image may be horizontally shifted, in the autostereoscopic image, before the image appears to be stuttered or jagged.

As mentioned earlier, all parameters should be in the same common unit, such as the true pixel units used throughout this Specification. To convert the front pixel spread to true pixel units, take the value for the front pixel spread and multiply it by the native resolution of the conglomeration being used to create the autostereoscopic image. Similarly, to convert the back pixel spread to true pixel units, take the value for the back pixel spread and multiply it by the native resolution of the conglomeration being used to create the autostereoscopic image.

Due to the importance of the back pixel spread and the front pixel spread for obtaining optimal autostereoscopic effect, with a minimal amount of stutter or jaggedness, the present invention provides a method for accurately calculating the front and back pixel spreads, which values can then be used for creating an autostereoscopic image. More specifically, the Discovery Phase, which will be described below, is the process through which the back pixel spread and the front pixel spread are calculated, based upon a test image. These values are then utilized in the Exploitation Phase, which is when the desired autostereoscopic image will be created.

Figure 7:
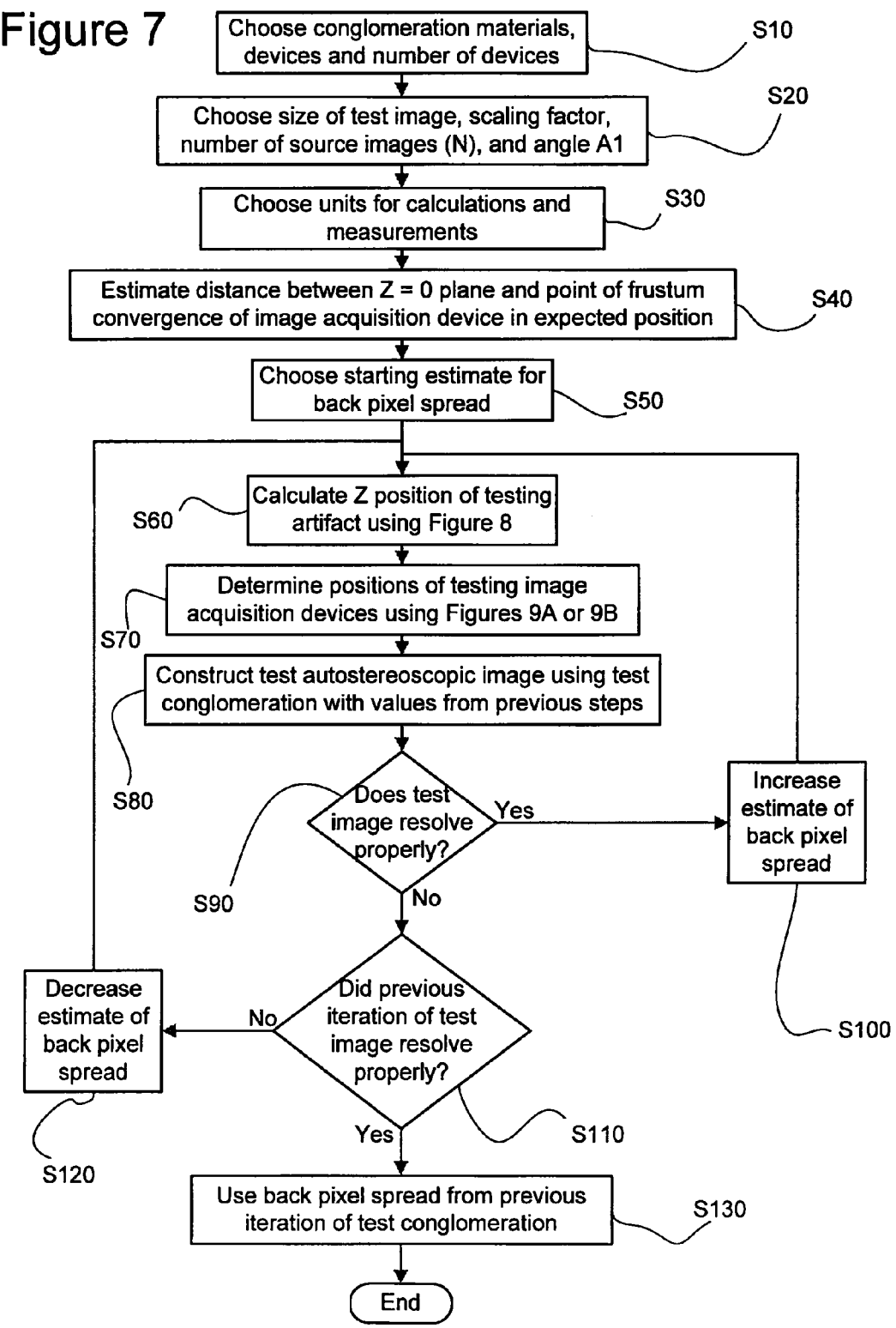
FIG. 7 is a flow chart for explaining the process steps of the Discovery Phase, as used to determine the back pixel spread.

FIG. 7 is a flow chart of the Discovery Phase, as this phase applies to determining the back pixel spread of a given conglomeration (which is a specific group of materials, output devices and output device settings used to create an autostereoscopic image). Preferably, the entire process of generating the interleaved subject image data file used to produce such a test image (thus the acquisition, processing and interleaving of necessary source imagery) occurs automatically within a computer graphic environment. One of the advantages of using the computer graphic environment is that the Discovery Phase can then be successfully implemented, with relative ease, by users possessing little or no prior knowledge of the process by which autostereoscopic images are created. As will be obvious to one of ordinary skill in the art, some of the steps of FIG. 7 can be completed in a different order than that shown.

Step S10 of FIG. 7 is the first step of the Discovery Phase, as applied to determining the back pixel spread. In Step S10, a conglomeration for creating arbitrary autostereoscopic images is chosen. During Step S10, an image acquisition device and respective image acquisition device settings are selected to be used for the purpose of acquiring the source images necessary to produce the autostereoscopic image being created in this test.

As part of determining the conglomeration, the optical member (such as a lenticular screen) will also be chosen. The selected optical member will have a set viewing angle, which can be designated as M.

In Step S20, it is determined at what physical size a test autostereoscopic image will be created using the conglomeration of Step S10. This test image will be used to ascertain values for either the front pixel spread or the back pixel spread (or both) of the conglomeration of Step S10. In Step S20, the necessary pixel dimensions of an interleaved subject image data file capable of producing the desired autostereoscopic image using the conglomeration are determined. If the case is such that the image acquisition device(s) (in the desired image acquisition device settings state) generating the source images being used to create this interleaved subject image data file generate(s) these source images at a pixel size that is not sufficient (either being too large or too small) to produce the interleaved subject image data file at the necessary pixel dimensions for the size and composition/cropping of the desired autostereoscopic image, a nontrivial scaling factor needs to be determined.

The scaling factor is a value by which the source images will be scaled prior to the interleave process so as to generate the interleaved subject image data file at the necessary pixel size. It is to be noted that from this conglomeration it is determined that the quantity of N interleave indices will exist in the interleaved subject image data file, and thus N source images will be acquired for this test image. N can be any value greater than 2, and is determined as follows: Assume that the number of optical units (see definitions section above for this term and other terms in this description) in the selected optical member is represented by the value D (as measured in linear units, such as 40 lenticules per inch regarding a lenticular screen). Also assume that the native resolution of the output device at the output device settings is R. Then, the number (N) of interleave positions/indices and source images required can be determined by N=R/D, where R/D is rounded up or down to an integer value using any standard founding scheme.

In this step, angle A1, which will be used later in FIG. 9A or FIG. 9B, as explained in Step S70, should also be calculated. The following formula is used to calculate A1: A1=(M)/(N−1), where M is ideally the viewing angle of the of the lenticular screen or parallax barrier that is a component of the conglomeration being tested, and N is the number of interleave positions/indices and source images, as mentioned in the previous paragraph. However, although using that value of the viewing angle as M is the ideal situation, any value for M between 0° and 180° in which (M)/(N−1) yields reasonable test results could be used, if desired.

In Step S30, the user chooses an arbitrary world unit (such as inches, centimeters, etc.) to be used to perform all subsequent world measurements for this testing phase.

In Step S40, using the world units chosen in Step S30, determine an arbitrary Z measurement which represents a very rough estimate of the distance FROM the point in space that is the intersection of the vector of the image acquisition device and the plane in space which is to coincide with the Z=0 plane in the autostereoscopic image TO the point of frustum convergence of the image acquisition device. Convert this Z measurement into true pixel units, and refer to it as Distance D.

In Step S50, determine a starting estimate for the back pixel spread to be used during the first iteration of this process. Convert this value into true pixel units, and refer to it as BPS In Step S60, use FIG. 8 to calculate the Z position of the testing artifact (which can be either a two dimensional object or a three dimensional object). In order to better keep track of the testing artifacts, it is suggested that the testing artifact be configured so as to visually correspond to the estimated pixel spread value. For example, if the pixel spread value is 0.0600, the testing artifact could be the string of numbers "0.0600". In this step, the Z position is found by calculating the position of Point A in FIG. 8. However, in order to locate the position of Point A, Points B and C must be plotted first.

Figure 8:
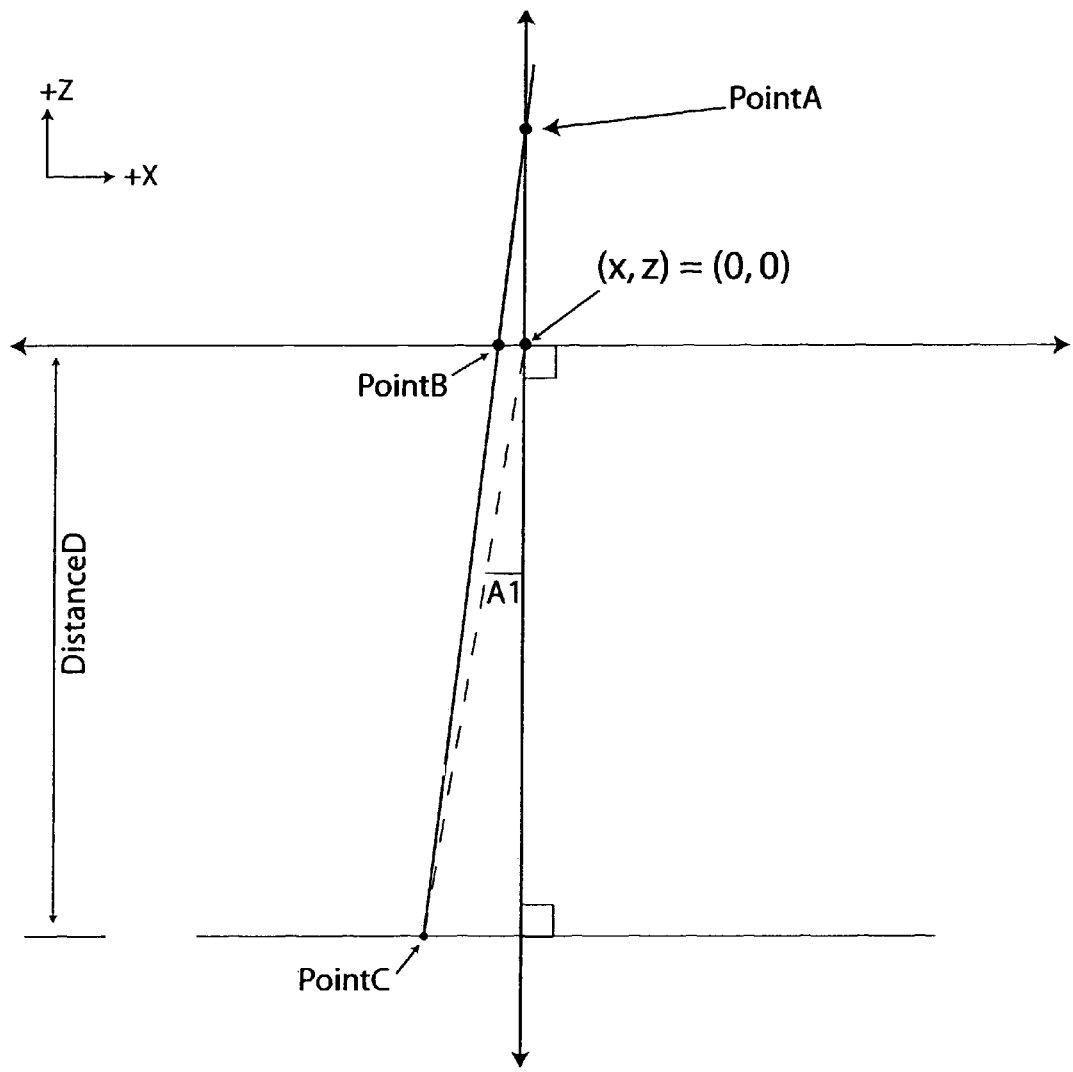
FIG. 8 is a diagram illustrating the placement of a testing artifact in three-dimensional space during the portion of the Discovery Phase used to determine the value of the back pixel spread for a conglomeration.

More specifically, on an X-Z graph as shown in FIG. 8, using the back pixel spread (BPS) from Step S50, position a Point B at the following (X, Z) coordinates: if N (from Step S20) is an odd number, then Point B=(−|BPS|, 0); and if N is an even number, then Point B=(−|BPS/2|, 0). In other words, if N is an odd number, point B is located on the X axis at the current estimated back pixel spread distance to the left of the Z axis (i.e., the negative absolute value of the current estimate of the BPS); and if N is an even number, point B is located on the X axis at one half of the current estimated back pixel spread distance to the left of the Z axis (i.e., the negative absolute value of the current estimate of the BPS divided by 2).

Next, position Point C as follows: the Z coordinate of Point C is Distance D of Step S40, and the X coordinate is arrived at by using angle A1 from Step S20 to create a line from the (X, Z) origin to the Z=D line, as shown in FIG. 8. Simple trigonometry can be used to arrive at the distance from the Z axis to Point C (such as the X direction distance to point C equals D×Tan A1, since distance D and angle A1 are known). Note that once Point C has been found, if the point is used in any further computations, the X coordinate must first be scaled by the scaling factor (see definitions section) of Step S20. Next, create a line between Point C and Point B, and extend this to reach the Z axis (i.e., where X=0), as shown in FIG. 8. This is Point A. Point A can be arrived at by manually graphing its location, by using known graphing software, or by making simple geometric calculations, either by hand or by computer. For example, the following formula may be used (where $X_A, Z_A$ are the coordinates of Point A; $X_B, Z_B$, are the coordinates of Point B and $X_C, Z_C$ are the coordinates of Point C): $Z_A=(((Z_B-Z_C)/(X_B-X_C))\times(X_A-X_B))+Z_B$. The Z value of Point A is the calculated Z position of the testing artifact. The X and Y positioning of the testing artifact is such that the object falls within the frustum of the image acquisition device. Now that Point A has been found, its Z coordinate is used as the Z coordinate of the testing artifact, whereby the testing artifact is located at the position (X, Y, Z).

Figure 9A:
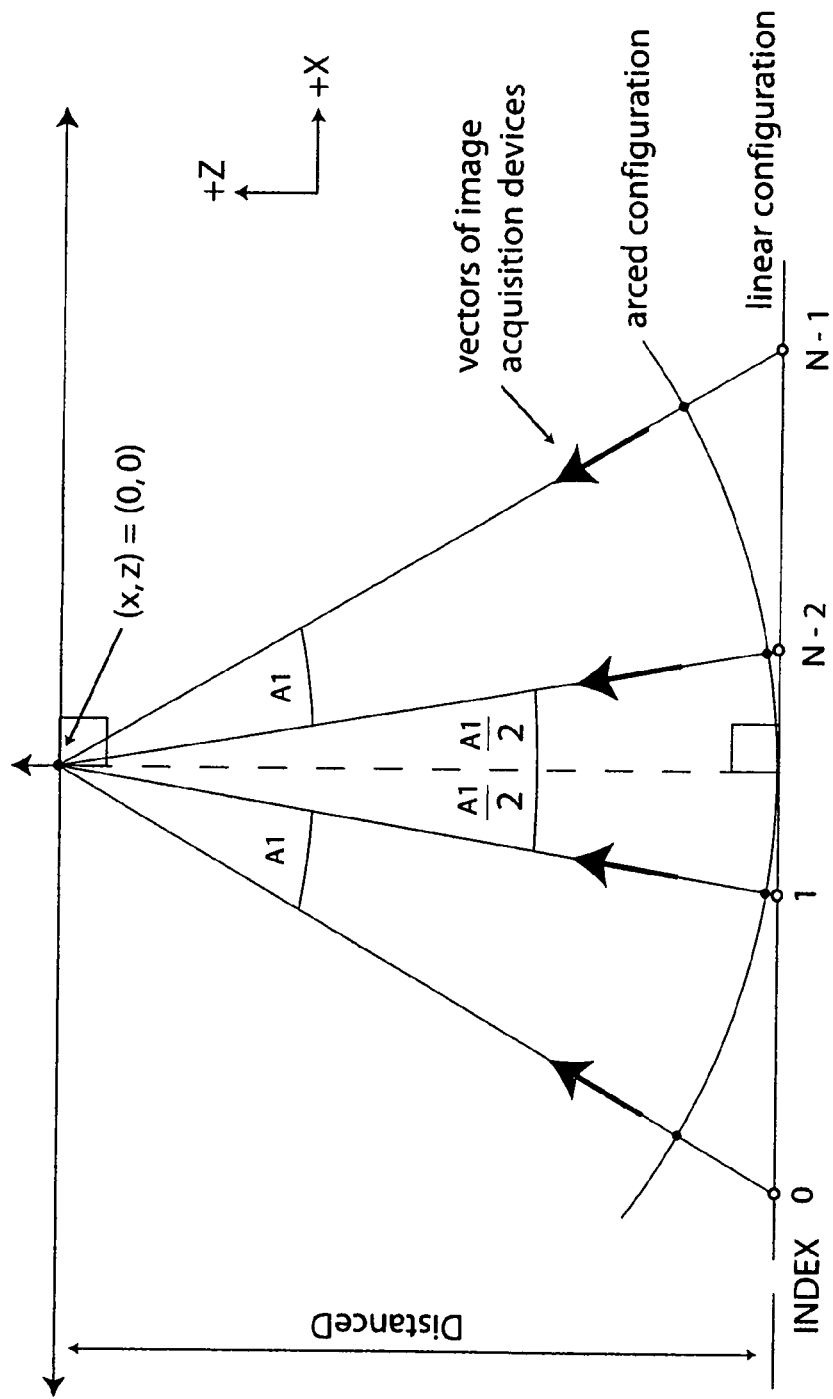
FIG. 9A is a diagram visually explaining the positioning of an even number (N) of image acquisition devices for an arbitrary image acquisition situation using an arbitrary conglomeration to create an autostereoscopic image for which there are known values for the front pixel spread and back pixel spread.
Figure 9B:
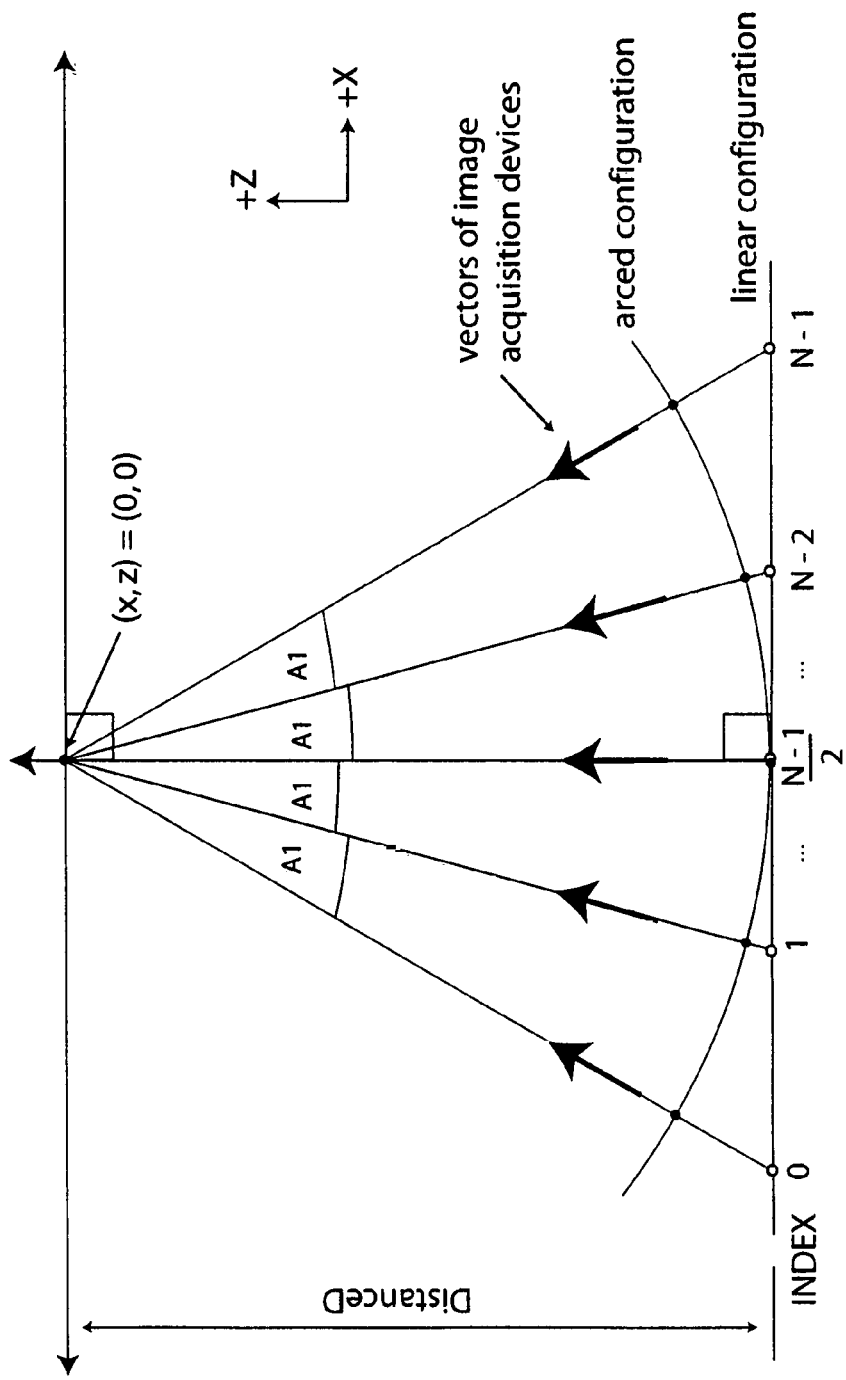
FIG. 9B is a diagram visually explaining the positioning of an odd number (N) of image acquisition devices for an arbitrary image acquisition situation using an arbitrary conglomeration to create an autostereoscopic image for which there are known values for the front pixel spread and back pixel spread.

In Step S70 of FIG. 7, determine the positions of the testing image acquisition devices (for creating the source images of the test autostereoscopic image) using FIGS. 9A and 9B, where FIG. 9A is used if the value of N is even, and FIG. 9B is used if the value of N is odd. In FIGS. 9A and 9B, the N image acquisition devices are designated 0, 1, . . . N−2, and N−1, and they are either placed in a linear configuration (with each device being represented by a hollow dot "○") or in an arced configuration (with each device being represented by a solid dot "●").

The positions of the image acquisition devices are determined by making the following calculations. Using Distance D from Step S40, and angle A1 from Step S20, use trigonometry or a graphing program to calculate each of the N positions of the image acquisition devices by using FIG. 9A if N is even and FIG. 9B is N is odd.

For example, assuming N is four (an even integer, so FIG. 9A is used) and the linear configuration is desired (i.e., hollow dots "○"), the Z coordinate for each of the four devices (0, 1, 2, 3) will be the negative value of distance D. The X coordinate of device 2 will be D×Tan (A1/2); the X coordinate of device 1 will be—D×Tan (A1/2); the X coordinate of device 0 will be—D×Tan (3×A1/2); and the X coordinate of device 3 will be D×Tan (3×A1/2). As another example, assuming N is 5 (an odd integer, so FIG. 9B is used) and the linear configuration is desired (i.e., hollow dots "○"), the Z coordinate for each device (0 through 4) will still be the negative value of distance D. However, the X coordinate of device 2 (the middle device in this case) will be 0; the X coordinate of device 3 will be D×Tan (A1); the X coordinate of device 4 will be D×Tan (2×A1); the X coordinate of device 0 will be—D×Tan (2×A1); and the X coordinate of device 1 will be—D×Tan (A1). Those of ordinary skill in the art would be able to determine the necessary calculations for the arced configuration (solid dots "●"), either by using simple geometry or by using graphing software. Further, although the values of 4 and 5 have been used for N in these examples, N is the whole number that corresponds to the predetermined number of source images (and the predetermined number of image acquisition devices) from step S20.

Returning to FIG. 7, in Step S80, a test autostereoscopic image is created, using the parameters of the conglomeration from the previous steps. More specifically, the testing artifact is located in the position determined in Step S60 and the image acquisition devices are located in the positions determined in Step S70. Next, the necessary N source images are acquired using the image acquisition devices and the image acquisition device settings state of Step S10. These N source images are then scaled, if the scaling factor is non-trivial, then subjected to any necessary projective mapping to correct for perspective and then interleaved into the interleaved subject image data file. Using the conglomeration being tested, the interleaved subject image data file is transferred to the display substrate and viewed through the optical member.

In Step S90, the test autostereoscopic image created in Step S80 is viewed to determine if it has resolved properly. More specifically, an entity (either a human or a machine, such as a computer) participating in the Discovery Phase acting as the judge of the results of the products of this phase views the autostereoscopic image at a distance from the autostereoscopic image that is within the acceptable viewing range and viewing distance dictated by the architecture of the optical member of the conglomeration used to create the autostereoscopic image. That entity then determines if the testing artifact contained in the resultant autostereoscopic image resolves properly, or if it appears stuttered/jagged/dissipated. If the testing artifact resolves properly, the process continues to Step S100 in which case the estimate of the back pixel spread is increased (i.e., the estimated value of the back pixel spread is increased to be greater in absolute value without switching the sign of the actual value). The testing process is then repeated from Step S60 forward.

On the other hand, if it is determined during Step S90 that the testing artifact appears stuttered/jagged/dissipated (i.e., the testing image did NOT resolve properly), the process continues to Step S110 to determine if the previous iteration of the test image resolved properly (with the previous estimated value of the back pixel spread). If the previous iteration of the test image resolved properly, then the estimate of the back pixel spread of the previous iteration is used (Step S130) and, if using a computer for this process, this value is preferably displayed on the computer screen or stored in the computer memory, and the Discovery Phase for determining the back pixel spread is compete. However, if the previous iteration of the test image did not resolve properly (or if there was no previous iteration because this is the first iteration), the process continues to Step S120.

In Step S120, the estimate of the back pixel spread is decreased (i.e., the current estimate of the back pixel spread is reduced to a lesser absolute value, without switching the sign). The testing process is then repeated from Step S60 forward.

It is the aim of the iterative sequence of tests during this Discovery Phase to discover a value for the back pixel spread which provides an image of the testing artifact that resolves, where the reasonably next greater absolute value for the back pixel spread provides a stuttered/jagged/dissipated appearance of the testing artifact. In other words, a back pixel spread of the largest absolute value is desired, which is the value just prior to the image becoming stuttered/jagged or dissipated. It is to be noted that more than one testing artifact, each illustrating a different back pixel spread, can populate a single autostereoscopic image being produced to determine the back pixel spread, as long as it is kept certain which testing artifact corresponds with which back pixel spread within a single test image.

After determining a valid value for the back pixel spread during this portion of the Discovery Phase, this value can be used for all similar conglomerations.

Next, the portion of the Discovery Phase for determining the front pixel spread (FIG. 6) will be explained. This portion of the Discovery Phase includes several sub-processes that are similar to those used to determine the back pixel spread. Accordingly, the sub-processes that are similar will only be briefly explained in order to avoid un-necessary repetition.

Turning now to FIG. 10, a flow chart of the steps for determining the front pixel spread during the Discovery Phase is shown. Steps S10 through S40 of the front pixel spread portion of the Discovery Phase are the same as they are for the back pixel spread portion (previously explained while referring to FIG. 7). Accordingly, the explanation for Steps S10 through S40 will not be repeated.

Step S50 of FIG. 10 is only slightly different from Step S50 of FIG. 7 because in this case, a starting estimate for the front pixel spread is determined (instead of a starting estimate for the back pixel spread). Convert this value into true pixel units, and refer to it as FPS.

In Step S60 of FIG. 10, a different diagram is used for determining Point A than that used in Step S60 of FIG. 7. Accordingly, a detailed explanation of this step will be provided.

Figure 11:
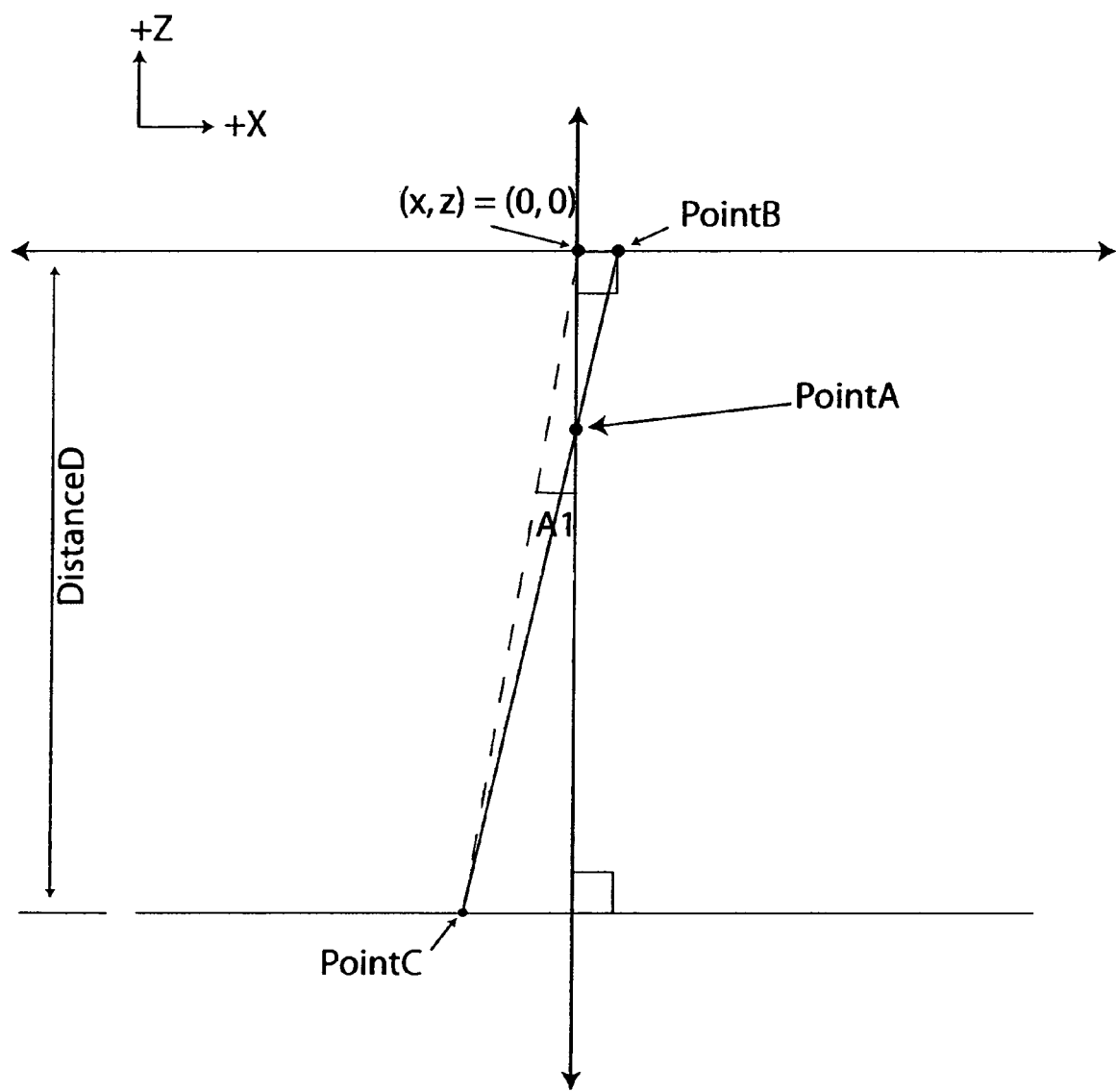
FIG. 11 is a diagram illustrating the placement of a testing artifact in three-dimensional space during the portion of the Discovery Phase used to determine the value of the front pixel spread for a conglomeration.

For Step S60, use FIG. 11 to calculate the Z position of the testing artifact. In this step, the Z position is found by calculating the position of Point A in FIG. 1. However, in order to locate the position of Point A, Points B and C must be plotted first.

More specifically, on an X-Z graph as shown in FIG. 1, using the front pixel spread (FPS) from Step S50, position a Point B at the following (X, Z) coordinates: if N (from Step S20) is an odd number, then Point B=(|FPS|, 0); and if N is an even number, then Point B=(|FPS/2|, 0). In other words, if N is an odd number, point B is located on the X axis at the current estimated front pixel spread distance to the right of the Z axis, and if N is an even number, point B is located on the X axis at one half of the current estimated front pixel spread distance to the right of the Z axis.

Next, position Point C as follows: the Z coordinate of Point C is Distance D of Step S40, and the X coordinate is arrived at by using angle A1 from Step S20 to create a line from the (X, Z) origin to the Z=D line, as shown in FIG. 1. Simple trigonometry can be used to arrive at the distance from the Z axis to Point C (such as the X direction distance to point C equals D×Tan A1, since distance D and angle A1 are known). Note that once Point C has been found, if the point is used in any further computations, the X coordinate must first be scaled by the scaling factor. Next, create a line between Point C and Point B, which line should cross the Z axis (i.e., where X=0), as shown in FIG. 11. This is Point A. Point A can be arrived at by manually graphing its location, by using known graphing software, or by making simple geometric calculations, either by hand or by computer. For example, the following formula, which was also used with regard to FIG. 8, may be used (where $X_A$, $Z_A$ are the coordinates of Point A; $X_B$, $Z_B$, are the coordinates of Point B and $X_C$, $Z_C$ are the coordinates of Point C): $Z_A=(((Z_B-Z_C)/(X_B-X_C))\times(X_A-X_B))+Z_B$. The Z value of Point A is the calculated Z position of the testing artifact. The X and Y positioning of the testing artifact is such that the object falls within the frustum of the image acquisition device. Now that Point A has been found, its Z coordinate is used as the Z coordinate of the testing artifact, whereby the testing artifact is located at the position (X, Y, Z).

In Step S70, the positions of the image acquisition devices are determined in the same manner as in Step S70 of FIG. 7 (using FIGS. 9A and 9B again). Accordingly, further explanation of this step is unnecessary.

In Step S80, the N source images are acquired, and the test autostereoscopic image is constructed, as previously described with regard to Step S80 of FIG. 7.

In Step S90, the test autostereoscopic image is viewed to determine if it resolved properly, as in Step S90 of FIG. 7. Depending upon whether the image resolved properly or not, the process continues to Step S100 or S110, in essentially the same manner as described with regard to the flowchart of FIG. 7, except in this process, which is intended to determine the front pixel spread, the values of the front pixel spread are changed (instead of changing the values of the back pixel spread, as in FIG. 7). It is the aim of the iterative sequence of tests of this process (the flowchart of FIGS. 10A and 10B) to discover a value for the front pixel spread which provides an image of the testing artifact that resolves, where the reasonably next greater absolute value for the front pixel spread provides a stuttered/jagged/dissipated appearance of the testing artifact. In other words, a front pixel spread of the largest absolute value is desired, which is the value just prior to the image becoming stuttered/jagged or dissipated. It is to be noted that more than one testing artifact, each illustrating a different front pixel spread, can populate a single autostereoscopic image being produced to determine the front pixel spread, as so long as it is kept certain which testing artifact corresponds with which front pixel spread within a single test image. Upon determining a valid value for the front pixel spread, this value can be used for all similar conglomerations.

Although the flowcharts of FIGS. 7 and 10 explain the one method of arriving at the back and front pixel spreads, respectively, there is also an alternate method of arriving at these parameters, which will be described while referring to FIGS. 12 through 14.

Figure 12:
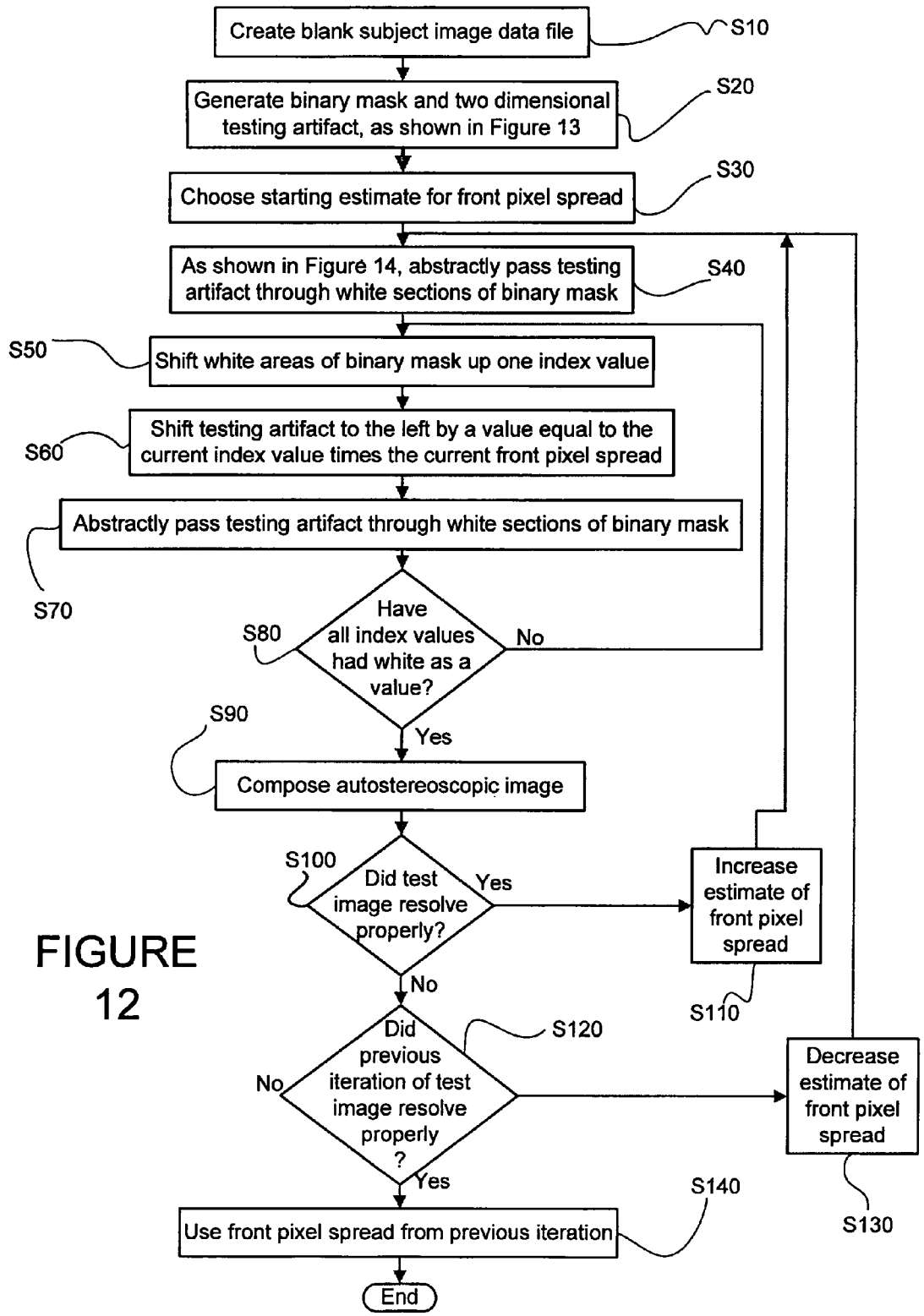
FIG. 12 is a flow chart for explaining the steps of an alternate method of the Discovery Phase, as used to calculate the front pixel spread.

Turning now to FIG. 12, the alternate method of the Discovery Phase for arriving at the front pixel spread will be described. This method is performed within a computer. In Step S10, generate a blank subject image data file of the pixel dimensions necessary to create a test autostereoscopic image at the physical size desired using the conglomeration that is to be tested.

In Step S20, generate a binary mask 24 (see FIG. 13) of the same pixel dimensions as the blank subject image data file generated in Step S10. In addition, generate a two-dimensional testing artifact 26 that is independent of the subject image data file and the binary mask 24. As with the preferred method of the Discovery Phase described earlier, in this alternate method, the testing artifact could also be configured so as to visually relate to the respective pixel spread value. For example, if the pixel spread value is 0.0600, the testing artifact could be the following string of numbers: "0.0600".

In Step S30, select the starting estimate for the front pixel spread (FPS), and then convert this value to true pixel units.

Figure 13:
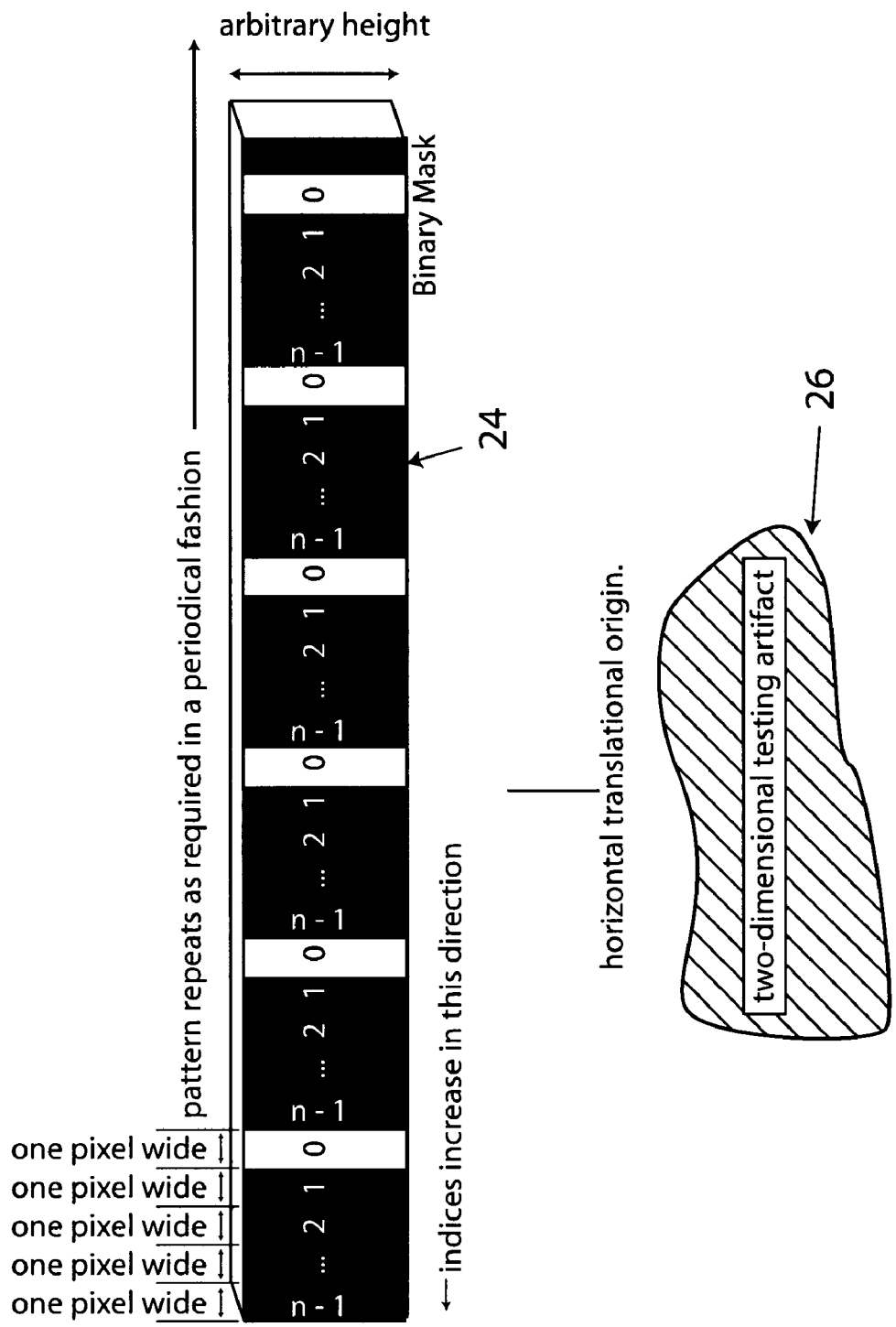
FIG. 13 is a diagram related to the alternate method of the Discovery Phase, illustrating a tool used in the creation of an interleaved subject data file with an encoded effect of parallax by means of direct pixel manipulation for the purpose of determining the front pixel spread and back pixel spread.

In Step S40, refer to the binary mask 24 of FIG. 13, and provide index numbers to the binary mask such that each white area of the binary mask is assigned the index number of zero. Each index number represents an area that is one pixel wide. Referring now to FIG. 14, abstractly locate the binary mask 24 between the subject image data file and the testing artifact 26, taking note of the position of the testing artifact relative to the horizontal translational origin. Next, abstractly pass the testing artifact 26 through the binary mask 24, where white areas of the mask allow vertical slices 26A, 26B, 26C of the testing artifact 26 to pass into the subject image data file, and black areas block such transferal.

Figure 14:
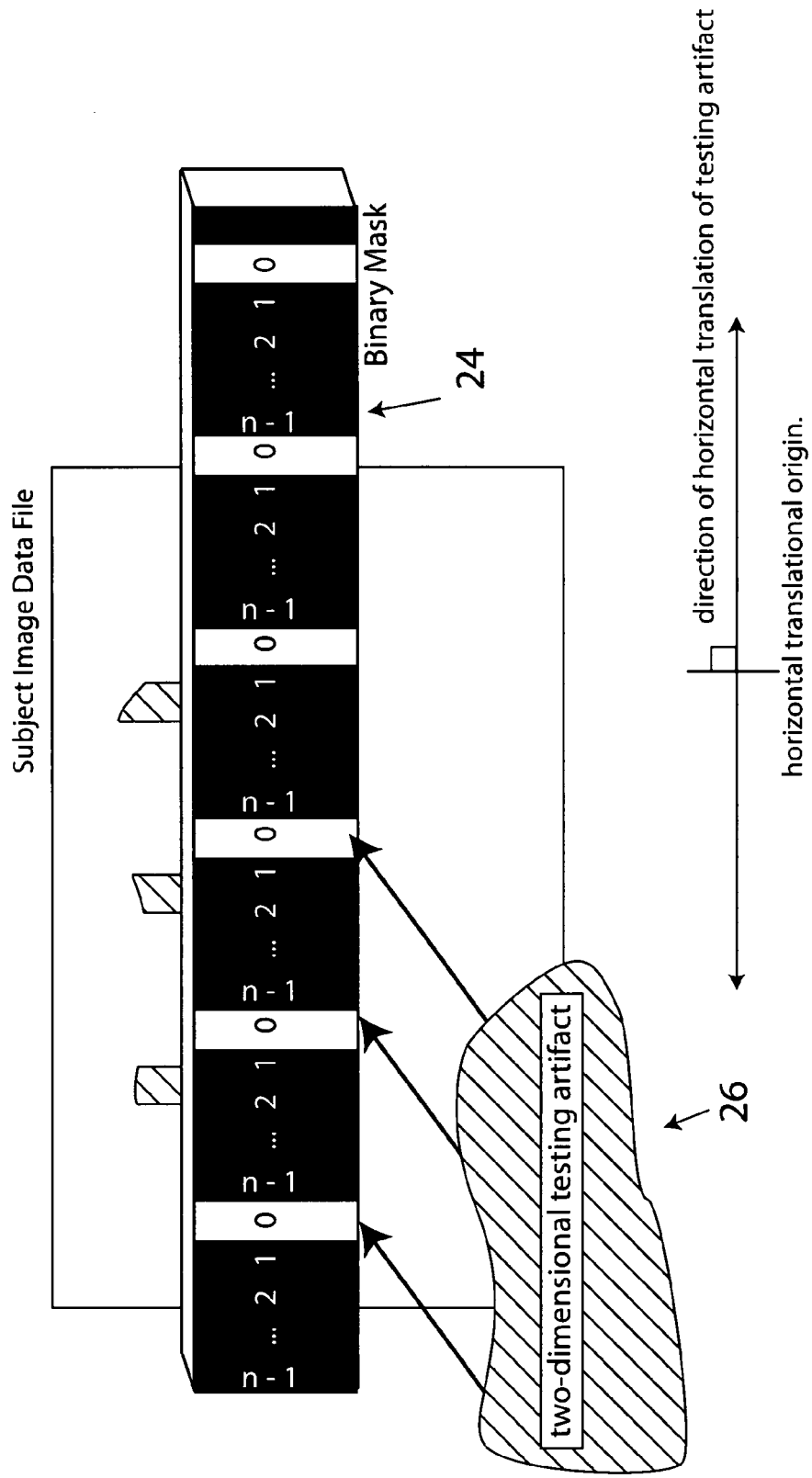
FIG. 14 is another diagram related to the alternate method of the Discovery Phase, illustrating a usage of the tool illustrated in FIG. 13.

In Step S50, shift the white areas of the binary mask up one index value (i.e., to the left as shown in FIGS. 13 and 14), filling all other indices with black. Then, abstractly locate the binary mask 24 between the subject image data file and the testing artifact 26 again.

In Step S60, initially locate the testing artifact 26 in the same position relative to the horizontal translational origin as in Step S40. Then shift the testing artifact 26 to the LEFT by the number of pixels equal to the value arrived at by multiplying the current Index Value by the current Front Pixel Spread (FPS), in true pixel units, where the value arrived at is rounded to the nearest pixel.

Once the testing artifact 26 has been shifted, in Step S70, abstractly pass the shifted testing artifact 26 through the binary mask. Once again, white areas of the mask allow vertical slices of the testing artifact to pass into the subject image data file, and black areas block such transferal.

In Step S80, determine whether all index numbers of the binary mask 24 have had white as a value (which will indicate that vertical slices of the testing artifact have been allowed to be transferred through each index of the binary mask). If all index numbers of the binary mask 24 have not had white as a value, return to Step S50. On the other hand, if all index numbers of the binary mask 24 have had white as a value, the subject image data file will contain information encoded with a parallax effect, and an interleaved subject image data file has been created. The process then continues to Step S90, in which an autostereoscopic image is created. More specifically, in Step S90, using the components of the conglomeration being tested, transfer the interleaved subject image data file to the display substrate and view through the optical member.

In Step S100, determine whether the test image has resolved properly. More specifically, an entity (human or machine) participating in the Discovery Phase acting as the judge of the results of the products of the phase views the autostereoscopic image at a distance from the autostereoscopic image that is within the acceptable viewing-range/viewing-distance dictated by the architecture of the optical member of the conglomeration used to create the autostereoscopic image, and that entity determines if the testing artifact contained in the resultant autostereoscopic image resolves properly or appears stuttered/jagged/dissipated. If the testing artifact resolves properly, the process continues to Step S110, in which the current estimate of the front pixel spread is increased to a value that is greater in absolute value without switching the sign of the actual value. The process then returns to Step S40 for further testing.

On the other hand, if the testing artifact appears stuttered/jagged/dissipated, the process continues to Step S120, in which it is determined whether the previous iteration of the test resolved properly. If the previous iteration did not resolve properly, the process continues to Step S130 in which the current estimate of the front pixel spread is decreased to a value that is of a lesser absolute value, without switching the sign of the actual number. The process then returns to Step S40 for further testing.

However, if it is determined in Step S120 that the previous iteration of the test resolved properly, then the estimated front pixel spread from that iteration is the final estimate (Step S130) and, if using a computer for this process, this value is preferably displayed on the computer screen or stored in the computer memory, and the process is terminated. Basically, it is the aim of the iterative sequence of tests in this process to discover a value for the front pixel spread which provides an image of the testing artifact that resolves, where the reasonably next greater absolute value for the front pixel spread provides a stuttered/jagged/dissipated appearance of the testing artifact. As with the other processes described, it is to be noted that more than one testing artifact, each illustrating a different front pixel spread, can populate a single autostereoscopic image being produced to determine the front pixel spread, as long as it is kept certain which testing artifact corresponds with which front pixel spread. After determining a valid value for the front pixel spread using this alternate method for the Discovery Phase, this value can be used for all similar conglomerations.

The alternate method of conducting the Discovery Phase for determining the back pixel spread is essentially the same as the method just described for determining the front pixel spread (FIGS. 12-14), except for one portion of Step S60. More specifically, when using the alternate method for determining the back pixel spread, in Step S60 the testing artifact 26 should be shifted to the right (instead of to the left as shown in FIG. 12). Otherwise, the alternate method for the back pixel spread is essentially the same as that just described for the front pixel spread, and the process of FIG. 12 can be followed by substituting the term "back pixel spread" for the term "front pixel spread" of the previous description.

Now that the Discovery Phase has been completed (by using either the preferred method or the alternate method), and the values of the front and back pixel spread have been determined, the next phase, the Exploitation Phase, will be described.

Figure 15:
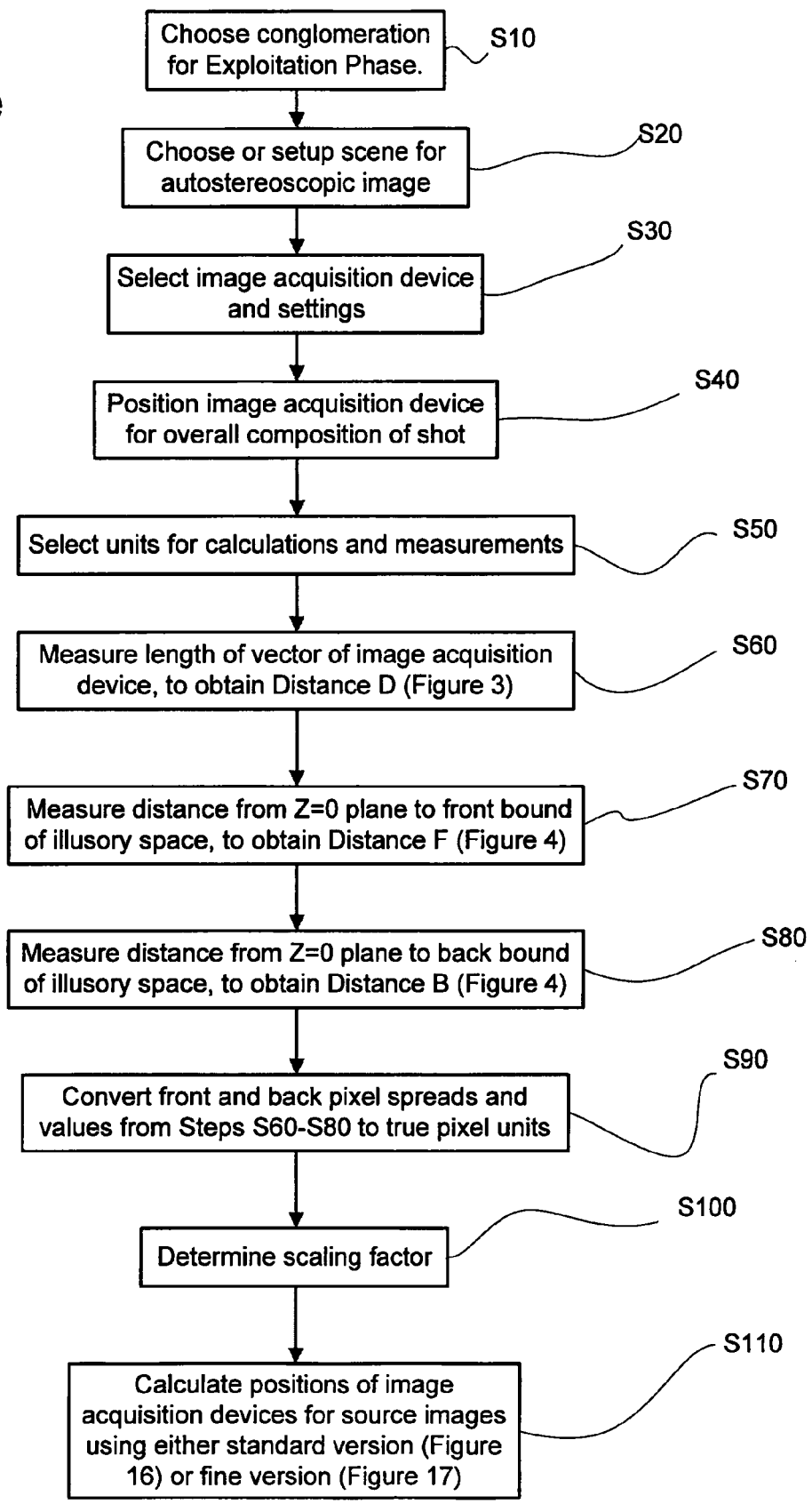
FIG. 15 is a flow chart for explaining the preliminary steps of the Exploitation Phase.

FIG. 15 is a flow chart of the preliminary steps of the Exploitation Phase. As will be obvious to one of ordinary skill in the art, some of the steps of FIG. 15 need not be competed in the exact order shown.

In Step S10, the Exploitation Phase begins by determining a conglomeration to be used in the creation of a desired autostereoscopic image of a specific physical size. This conglomeration is to have known values for the front pixel spread and back pixel spread by way of a successfully completed Discovery Phase. If these values are not known, a successful Discovery Phase for the conglomeration must be completed.

In Step S20, a scene containing subject matter which will populate the autostereoscopic image is setup or chosen. This scene can exist in the real world or an arbitrary computer graphic world (or a hybrid of such, that is, existing by way of photogrammetry or other process by which a three-dimensional world is inferred by way of a two-dimension image or set of such images).

In Step S30, an image acquisition device with respective image acquisition device settings is selected to be used for composing the overall shot that is to exist in the resultant autostereoscopic image.

In Step S40, the selected image acquisition device is positioned, relative to the scene of Step S20, for the purpose of composing the overall shot. This composition of the shot is to be roughly the composition the viewer will experience when viewing the resultant autostereoscopic image from straight on. However, the composition may possibly be altered depending upon whether or not a non-trivial scaling factor is imposed upon acquired source imagery during the creation of the interleaved subject image data file using the source imagery. It is to be noted that once the composition is chosen, alteration of the Z positioning of the image acquisition device or alteration of the image acquisition device settings must be followed by starting the process over at this step.

In Step S50, choose an arbitrary world unit (centimeters, inches, etc.) to be used to perform all subsequent world distance measurements.

In Step S60, using the world units chosen in Step S50, measure the length of the vector of the image acquisition device 18 (FIG. 3) to obtain Distance D. More specifically, measure FROM point 20 (the point in space that is the intersection of the vector of the image acquisition device and the plane which is to be the Z=0 plane in the autostereoscopic image) TO point 16 (the point of frustum convergence of the image acquisition device being used to compose the shot).

In Step S70, using the world units chosen in Step S50, measure distance F of FIG. 4. More specifically, measure FROM the point in space that is the intersection of the vector of the image acquisition device and the plane which is to be the Z=0 plane in the autostereoscopic image TO the point in space within the scene that is the intersection of the vector of the image acquisition device and the Z=front bound of illusory space plane.

In Step S80, using the world units chosen in Step S50, measure distance B of FIG. 4. More specifically, measure FROM the point in space that is the intersection of the vector of the image acquisition device and the plane which is to be the Z=0 plane in the autostereoscopic image TO the point in space within the scene that is the intersection of the vector of the image acquisition device and the Z=back bound of illusory space plane.

In Step S90, convert the measurements taken in Steps S60 to S80 and the front and back pixel spreads (from the Discovery Phase) to true pixel units using Equation 1 [TPperWU= ((0.5*pixHeight)/tan(0.5*VFOV))/Zwu], which was explained earlier.

In Step S100, determine the scaling factor necessary to produce the desired autostereoscopic image of the desired composition/cropping at the desired physical size using the chosen conglomeration (noting the native resolution of the conglomeration) and the pixel size of the source imagery gathered using the image acquisition device at the given image acquisition device settings.

Having arrived at Step S110, it is now possible to algorithmically calculate the image acquisition device positions, for the devices used to obtain the multiple source images, mutually exclusively using one of two families of computational algorithms, either the standard versions or the fine versions, both of which will be explained below. While the fine versions are more precise in the determination of the image acquisition device positions through the consideration of individual pixel spread values in the calculation of each discrete image acquisition device position, they do take more computation time Than the standard versions. For many applications, the standard versions, which utilizes a system-wide central angle to calculate each discrete image acquisition device position, is sufficient.

Figure 16:
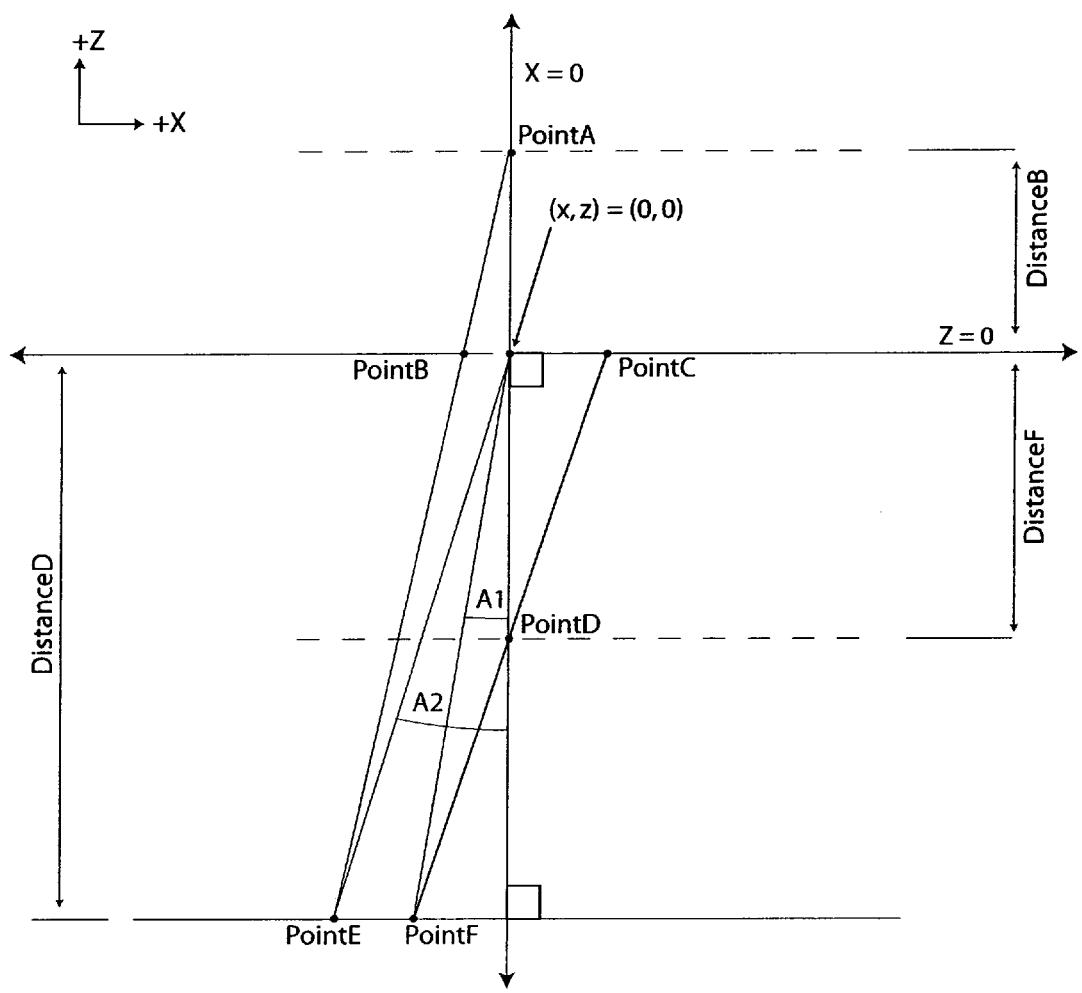
FIG. 16 is a diagram used during the direct standard and direct fine versions of the Exploitation Phase for determining a potential central angle used for image acquisition device positioning for an arbitrary image acquisition situation.

Referring now to FIG. 16, the standard versions of calculating the positions of the image acquisition devices will be described. With the values of Steps S60-S80 of FIG. 15 converted to true pixel units (as described in Step S90), and with the scaling factor determined in Step S100, FIG. 16 or FIG. 17 can be used to formulate elementary mathematical equations used to perform either a DIRECT computation (FIG. 16) or an INDIRECT computation (FIG. 17) of the angle that is central to any two adjacent image acquisition device positions, which angle will be referred to as the computed angle. This computed angle will theoretically maximize the usage of the illusory three-dimensional depth properties of the conglomeration being used to produce the autostereoscopic image using the values given. In actual usage, any angle equal to or less than this computed angle can be used determine the image acquisition device positions to guarantee that all the visual elements of the scene will properly resolve. However, angles closer in value to the computed angle will provide for a more pronounced illusory three-dimensional effect than those that are far less in value.

Referring again to FIG. 16, the direct method of determining the computed angle will be described. Briefly, using the X-Z coordinates of FIG. 16, Points A, B, C and D can be plotted (in any order) from known values, as described below, and then Points E and F and angles A1 and A2 can be calculated. Angles A1 and A2 are two versions of the "computed angle" mentioned above, where the final computed angle is the lesser of angles A1 and A2.

More specifically, plot Point A on the Z axis at Distance B (from Step S80 of FIG. 15, converted to true pixel units, as per Step S90). Plot Point D on the X axis at Distance F (from Step S70 of FIG. 15, converted to true pixel units, as per step S90). It should be noted that when used as a Z-axis coordinate, Distance F is a negative value.

As indicated in FIG. 16, Points B and C are both located on the X axis (i.e., with 0 as their Z coordinates). However, the x positions of Points B and C depend upon whether N (the number of image acquisition devices) is odd or even. If N is an odd number, the X coordinate of Point B is the negative absolute value of the back pixel spread (BPS), and the X coordinate of Point C is the absolute value of the front pixel spread (FPS), where both the BPS and the FPS have been converted to true pixel units, as per Step S90 of FIG. 15. On the other hand, if N is an even number the X coordinate of Point B is one half of the negative absolute value of the back pixel spread (BPS), and the X coordinate of Point C is one half of the absolute value of the front pixel spread (FPS), where both the BPS and the FPS have been converted to true pixel units, as per Step S90 of FIG. 15.

Using Points A, B, C and D, and graphing software or routine geometric calculations, determine the locations of Points E and F, and angles A1 and A2. More specifically, plot Point E by creating a line between Point A and Point B and find the intersection of this line with the line Z=Distance D (from Step S60, as converted in Step S90). Next, plot Point F by creating a line between Point C and Point D and find the intersection of this line with the line Z=Distance D (noting that, in FIG. 23, when used as a coordinate, Distance D is a negative value).

Next, using Point E, the origin (0, 0) and Distance D, trigonometrically determine the measure of angle A2 (remember to consider any scaling requirement in FIG. 16 that is placed on the X coordinate of Point E once Point E is used in such subsequent computations). Using Point F (with any scaling requirement), the origin (0,0) and Distance D, trigonometrically determine the measure of angle A1. For example, the following formula may be used: A1=Tan$^{-1}$((X$_F$×(1/Scaling Factor))/|Distance F|). With this direct method of computation, the "computed angle" between any two image acquisition device positions is the lesser of the two angles A1 and A2, noting that if the number of image acquisition device positions, N, is even, this "computed angle" must be multiplied by 2 before being used in any subsequent image acquisition device position calculations.

Figure 17:
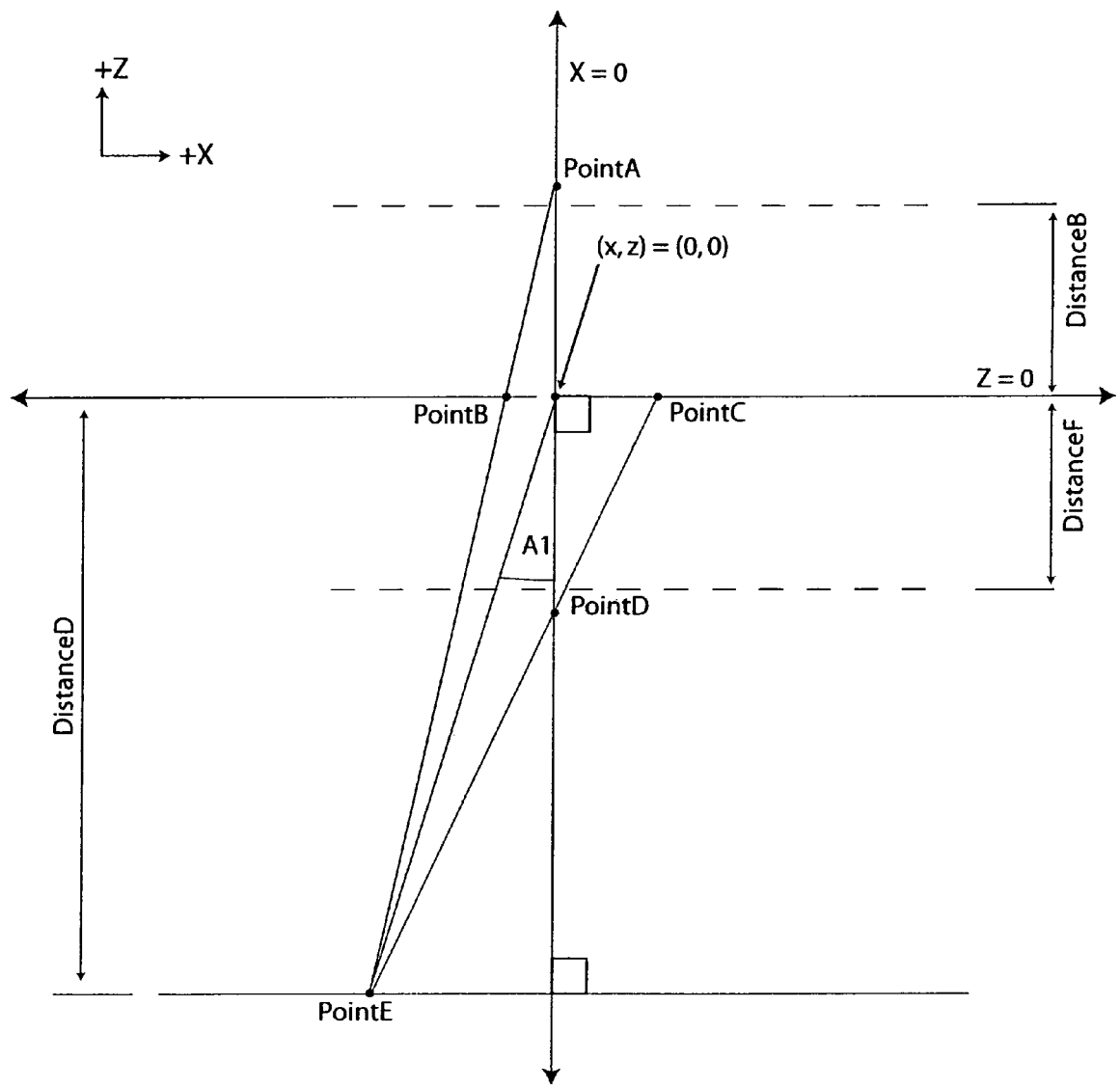
FIG. 17 is a diagram used during the indirect standard version of the Exploitation Phase for determining a potential central angle used for image acquisition device positioning for an arbitrary image acquisition situation.

Referring now to FIG. 17, the indirect method of determining the computed angle will be described. Briefly, using the X-Z coordinates of FIG. 17, Points B and C can be plotted (in any order) from known values, as described below, and angle A1 is estimated, then Point E is plotted using trigonometry and the estimated angle A1. Points A and D are determined using common graphing techniques and/or trigonometry. The Z coordinate of Point A is compared to Distance B (Step S80 of FIG. 15) and the Z coordinate of Point D is compared to the Z coordinate at Distance F (Step S70 of FIG. 15), keeping in mind that the Z coordinate of Distance F is negative (and thus a value of, for example, −2 is greater than a value of −5). If one of the following is true, the computed angle is determined to be angle A1: (i) the Z coordinate of Point A is equal to Distance B and the Z coordinate of Point D be greater than or equal to the Z coordinate at Distance F; or (ii) if the Z coordinate of Point D is equal to the Z coordinate at Distance F and the Z coordinate of Point A is less than or equal to Distance B. However, if neither (i) nor (ii) above is true, the estimate of the angle A1 is adjusted, and the process repeated until either condition (i) or condition (ii) is true.

A fuller description of the indirect method of determining the computed angle will now be described, while referring to FIG. 17.

Distance D, Distance B and Distance F, which are known values determined, and converted to true pixel units, during the process of FIG. 15, are plotted along the Z axis of the X-Z coordinates, as shown in FIG. 17. Point B is plotted as follows: Point B is plotted on the X axis at the coordinate X=the negative absolute value of the back pixel spread (converted to true pixel units, as per Step S90 of FIG. 15) if N is an odd value, and if N is an even value, the same value of Step S90 is multiplied by ½. In a similar fashion, Point C is plotted on the X axis at the coordinate X=the absolute value of the front pixel spread (converted to true pixel units, as per Step S90 of FIG. 15) if N is an odd value, and if N is an even value, the same value of Step S90 is multiplied by ½. Next, an estimate of angle A1 of between 0° and 180° is selected.

With the locations of Points B and C and the estimated value of angle A1, the following steps are performed, either by hand or using graphing software. Using the origin (0, 0), Distance D and angle A1, trigonometrically determine Point E. Using Point E (note the scaling requirement in FIG. 17 that is placed on the X coordinate of Point E once Point E is used in such subsequent computations) and Point B, formulate and solve the necessary elementary mathematical equations to determine the point of intersection between the line formed between Point E and Point B and the line X=0, calling the point of intersection Point A.

For example, the following calculations may be performed (where $X_A$, $Z_A$ are the coordinates of Point A; $X_B$, $Z_B$ are the coordinates of Point B; $X_C$, $Z_C$ are the coordinates of Point C; $X_D$, $Z_D$ are the coordinates of Point D; and $X_E$, $Z_E$ are the coordinates of Point E):

$$X_E = \mathrm{Tan}(A1) \times (-|\mathrm{Distance}\,F|)$$

$$Z_A = ((((Z_E - Z_B)/((X_E \times \text{Scaling Factor}^{-1}) \times X_B))) \times (X_A - (X_E \times \text{Scaling Factor}^{-1}))) + Z_E$$

Next, using Point E (note the scaling requirement) and Point C, formulate and solve the necessary elementary mathematical equations to determine the point of intersection between the line formed between Point E and Point C and the line X=0, calling the point of intersection Point D. For example, $Z_D = ((((Z_E - Z_C)/((X_E \times \text{Scaling Factor}^{-1}) - X_C)) \times (X_D - (X_E \times \text{Scaling Factor}^{-1}))) + Z_E$.

Compare the Z coordinate of Point A with Distance B (used as a Z coordinate) and also compare the Z coordinate of Point D with Distance F (used as a Z coordinate). Paying note to the sign of the values, it is the intention of this step to either have: (i) the Z coordinate of Point A be equal to Distance B (used as a Z coordinate) and the Z coordinate of Point D be greater than or equal to Distance F (used as a Z coordinate); or (ii) the Z coordinate of Point D be equal to Distance F (used as a Z coordinate) and the Z coordinate of Point A be less than or equal to Distance B (used as a Z coordinate). If neither of these cases (i) or (ii) are satisfied, rerun this immediate step with an adjusted value for angle A1 (with all other known values being the same) and continue this process, with different values for angle A1, until either case (i) or case (ii) is satisfied.

Once a value for A1 is determined such that the outcome satisfies either case (i) or case (ii); use this value of A1 as the "computed angle" in further steps, if N (the number of image acquisition devices) is an odd value. If N is an even value, this computed angle must be multiplied by two (2), before it can be used in any subsequent image acquisition device position calculations.

Next, determine if the "computed angle" (already multiplied by two, if N is even), which would provide for a theoretical maximization of illusory space, is to be used as the "central angle" in the actual computation of the image acquisition device positions, or if an angle of lesser value providing for a less than maximized usage of the illusory three-dimensional depth properties is to be used as the central angle in the calculations determining the image acquisition device positions.

Turning again to FIGS. 9A and 9B, use these figures to determine the N different positions of the image acquisition devices to be used in the Exploitation Phase. More specifically, use FIG. 9A if the value of N is an even number, and FIG. 9B if N is an odd number. First, assuming that N is an even number, FIG. 9A shows how the central angle A1 previously discussed can be used to determine the locations of the image acquisition devices, where the N locations are designated as 0, 1, . . . N−2 and N−1. On the other hand, if N is odd FIG. 9B is to be used, and the N locations are designated as 0, 1, . . . (N−1)/2, . . . N−2, N−1. As shown in FIGS. 9A and 9B, the N image acquisition devices can either be placed in a linear configuration (with each device being represented by a hollow dot "○") or in an arced configuration (with each device being represented by a solid dot "●"). Using the known values of A1 and Distance D (converted to true pixel units), formulate and solve elementary mathematical equations (either by hand or with computer software) to determine all N image acquisition device positions for either the arced configuration or the linear configuration.

For example, assuming N is four (an even integer, so FIG. 9A is used) and the linear configuration is desired (i.e., hollow dots "○"), the Z coordinate for each of the four devices (0, 1, 2, 3) will be the negative value of distance D. The X coordinate of device 2 will be D×Tan (A1/2); the X coordinate of device 1 will be—D×Tan (A1/2); the X coordinate of device 0 will be—D×Tan (3×A1/2); and the X coordinate of device 3 will be D×Tan (3×A1/2).

As another example, assuming N is 5 (an odd integer, so FIG. 9B is used) and the linear configuration is desired (i.e., hollow dots "○"), the Z coordinate for each device (0 through 4) will still be the negative value of distance D. However, the X coordinate of device 2 (the middle device in this case) will be 0; the X coordinate of device 3 will be D×Tan (A1); the X coordinate of device 4 will be D×Tan (2×A1); the X coordinate of device 0 will be—D×Tan (2×A1); and the X coordinate of device 1 will be—D×Tan (A1).

Those of ordinary skill in the art would be able to determine the necessary calculations for the arced configuration (solid dots "●"), either by using simple geometry or by using graphing software. Further, although the values of 4 and 5 have been used for N in these examples, N is the whole number that corresponds to the predetermined number of source images (and the predetermined number of image acquisition devices).

Once the image acquisition device positions are determined, the vectors of the image acquisition devices are determined to emanate respectively from the positions and point at the x, z, origin (0,0). These vectors represent discrete rotational information that is a portion of each discrete image acquisition device position. It is this rotational information, which is a component of the information comprising the discrete image acquisition device positions, that are to be presented to the entity involved in the Exploitation Phase. It is ideal that the entity follow this information as closely as possible when positioning the image acquisition devices. However, given proper handling and alignment of the resultant acquired source imagery, it is sufficient to point the vectors of the actual image acquisition devices merely in a direction so as to include all desired elements in the composition.

Next, the calculated image acquisition device positioning information is presented to the entity participating in the current Exploitation Phase, converting positioning information back into world units as necessary using the inverse of the TPperWU conversion factor (Equation 1). It is possible that the entity is a human who will use this positioning information to physically position the image acquisition device(s) and to then acquire the source imagery. It is also possible that the entity is a computer graphic software entity, which will use this positioning information to position the image acquisition devices within a computer graphic environment and acquire source imagery.

As mentioned earlier, instead of using the standard versions for calculating the positions of the image acquisition devices, more accurate calculations for positioning the devices may be obtained, if desired, by using the fine versions, which will be explained next. The fine versions use the same process as the standard, direct method of calculating the computed angle (A1 or A2), as described while referring to FIG. 16, except after the lesser value angle (either A1 or A2) has been selected, it should be noted whether A1 or A2 was chosen. This is the case because angle A1 is more closely associated with the front pixel spread, and angle A2 is more closely associated with the back pixel spread and further calculations of the fine versions vary, depending upon whether the front pixel spread based value A1 is the computed angle or the back pixel spread based value A2 is the computed angle. Referring to FIG. 16, one can see how angle A1 is associated with the front pixel spread (because Point C, which is based on the front pixel spread, is a point on one of the lines that define angle A1), and how angle A2 is associated with the back pixel spread (because Point B, which is based on the back pixel spread, is one of the lines that defined angle A2).

Another important difference between the fine versions and the standard version, besides requiring knowledge of which angle A1 or A2 is the lesser angle of FIG. 16, is that further calculations of the positions for the image acquisition devices are different from those previously discussed with regard to FIGS. 9A and 9B, and those further calculations are dependent upon whether front pixel spread based angle A1 has been selected, or if back pixel based angle A2 has been selected. Further calculations of the positions also require the use of the value for the front pixel spread (if using A1) or the back pixel spread (if using A2), which were not required in FIGS. 9A and 9B. It should be noted that instead of using the exact values of the either the front pixel spread (FPS) or the back pixel spread (BPS), converted to true pixel units (as per Step S90 of FIG. 15), values less than the FPS or the BPS may be used, if desired. However, it should be noted that such lesser values would not theoretically maximize the usage of the illusory three-dimensional depth properties of the conglomeration being used to produce the autostereoscopic image. Thus, it is suggested that a pixel spread closer in value to the computed pixel spread be used, because such value will provide for a more pronounced illusory three-dimensional effect than one relatively less in absolute value.

In the fine versions, FIGS. 18-21 are used to determine the positions of the image acquisition devices. Once again, the figure used depends upon whether N is an odd value or an even value. Additionally, whether the pixel spread value is a front pixel spread or a back pixel spread also directs which figure is to be selected. More specifically, if the front pixel spread is chosen, FIG. 18 is used if the value of N is odd, and FIG. 19 is used if the value of N is even; and if the back pixel spread is chosen, FIG. 20 is used if the value of N is odd and FIG. 21 is chosen if N is even.

Figure 18A:
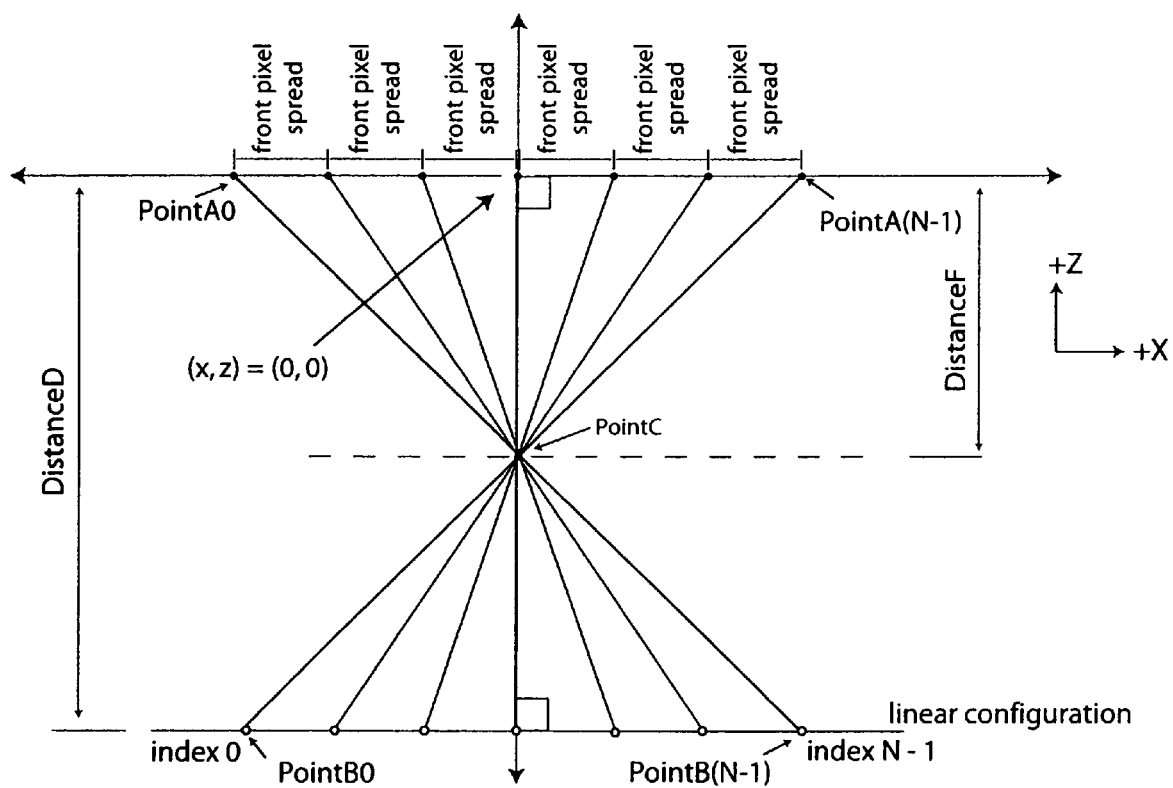
FIGS. 18A and 18B are diagrams used during the fine version of the Exploitation Phase to determine the image acquisition device positions in the case where the front pixel spread has been chosen to be used, and where the number of image acquisition device positions, N, is odd.
Figure 18B:
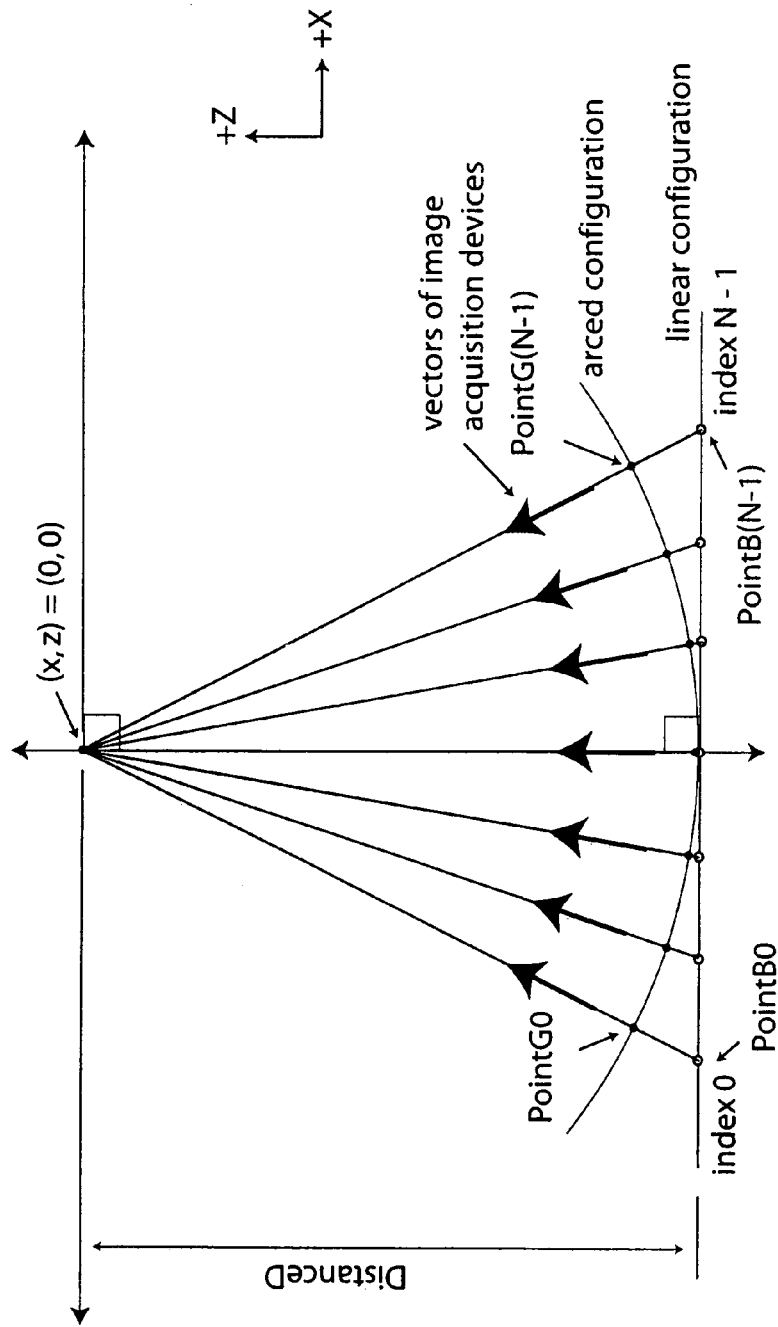

Turning first to the case in which the front pixel spread has been chosen and the value of N is odd, refer to FIGS. 18A and 18B. Using FIG. 18A first, plot the following known lines (either manually or using graphing software) on an X, Z graph, below the X axis: a line at Distance D (in true pixel units from Step S90 of FIG. 15); and a line Distance F (in true pixel units from Step S90 of FIG. 15). In addition, plot the following points on the X axis: Point C, which is located on the Distance F line and the Z axis; and Point $A_0$ through Point $A_{(N-1)}$, where N is the number of image acquisition devices, and where the distances between Point $A_0$ and the next adjacent Point A (such as $A_1$) is the front pixel spread (in true pixel units from Step S90 of FIG. 15) as shown in FIG. 18A.

After each Point A has been plotted (until reaching Point $A_{(N-1)}$), create a line from each Point A that extends through Point C, and finally reaches the Distance D line. Sequentially label these points as Point $B_0$, Point $B_1$, etc., through Point $B_{(N-1)}$, as indicated in FIG. 18A.

Next, refer to FIG. 18B, which is another X, Z graph, where a Distance D line has been added, as in FIG. 18A. After inversely scaling (multiplying by 1/Scaling Factor) the values for Point $B_0$, Point $B_1$, etc., through Point $B_{(N-1)}$, arrived at from FIG. 18A, plot these points as indicated in FIG. 18B. If a linear configuration is desired, Points $B_0$ through $B_{(N-1)}$ are the N positions for the image acquisition devices. In the alternative, if an arced configuration is desired, Points $G_0$ through $G_{(N-1)}$, which represent the positions of the image acquisitions devices in the arced configuration, can be calculated by hand or with graphing software.

After Points $B_0$ through $B_{(N-1)}$ and/or Points $G_0$ through $G_{(N-1)}$ have been calculated, the vectors of the image acquisition devices are determined to emanate respectively from either set of points, and point towards the origin (0,0). These vectors (as well as the vectors of FIGS. 19B, 20B and 21B, described below) represent discrete rotational information that is a portion of each discrete image acquisition device position. It should be noted for this case, as well as for the cases shown in FIGS. 19B, 20B and 21B, that while it is ideal that the vectors of the actual image acquisition devices point in these same directions upon image acquisition as those immediately here calculated, given proper handling and alignment of the resultant acquired source imagery, it is sufficient to point the vectors of the actual image acquisition devices merely in a direction so as to include all desired elements in the composition.

Figure 19A:
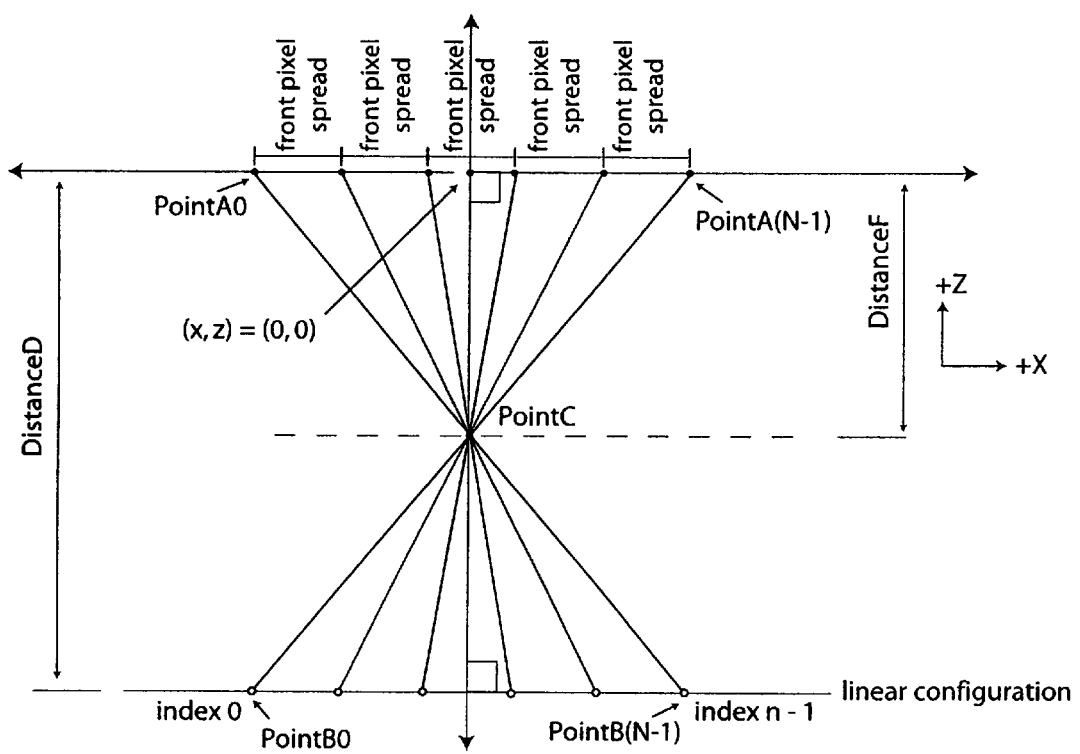
FIGS. 19A and 19B are diagrams used during the fine version of the Exploitation Phase to determine the image acquisition device positions in the case where the front pixel spread has been chosen to be used, and where the number of image acquisition device positions, N, is even.
Figure 19B:
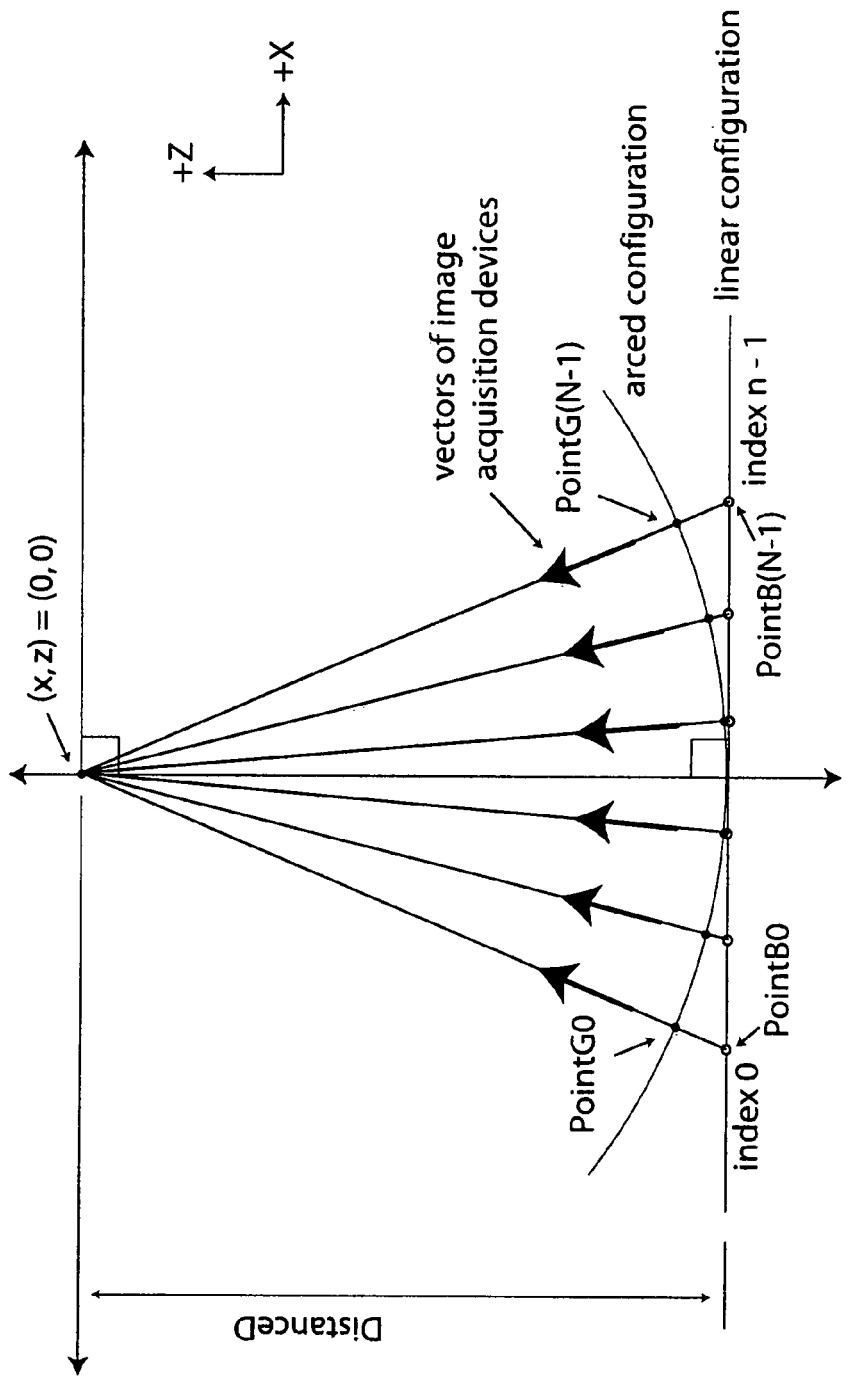

Turning next to the case in which the front pixel spread has been chosen and the value of N is even, refer to FIGS. 19A and 19B. As can be seen from comparing FIG. 19A with FIG. 18A and by comparing FIG. 19B with FIG. 19A, the corresponding sets of figures are very similar. The primary difference between FIGS. 19A-B and FIGS. 18A-B is that in FIGS. 18A-B, one value of Point A and one value of Point G will be located on the Z axis, and in FIGS. 19A-19B, there are no values of Point A or Point G on the Z axis (the two central values of Point A are at a distance of ½×the Front Pixel Spread to the left or right of the Z axis). This is the case because for an odd number of image acquisition device positions (FIGS. 18A-18B), one of them will be centered in the X direction, and for an even number of device positions, there is no position that is in the center of the other positions. Thus, other than this difference, the image acquisition positions for an even number of positions can be calculated using FIGS. 19A and 19B in essentially the same manner as described above with regard to FIGS. 18A and 18B. Accordingly, further explanation of FIGS. 19A and 19B is unnecessary.

Figure 20A:
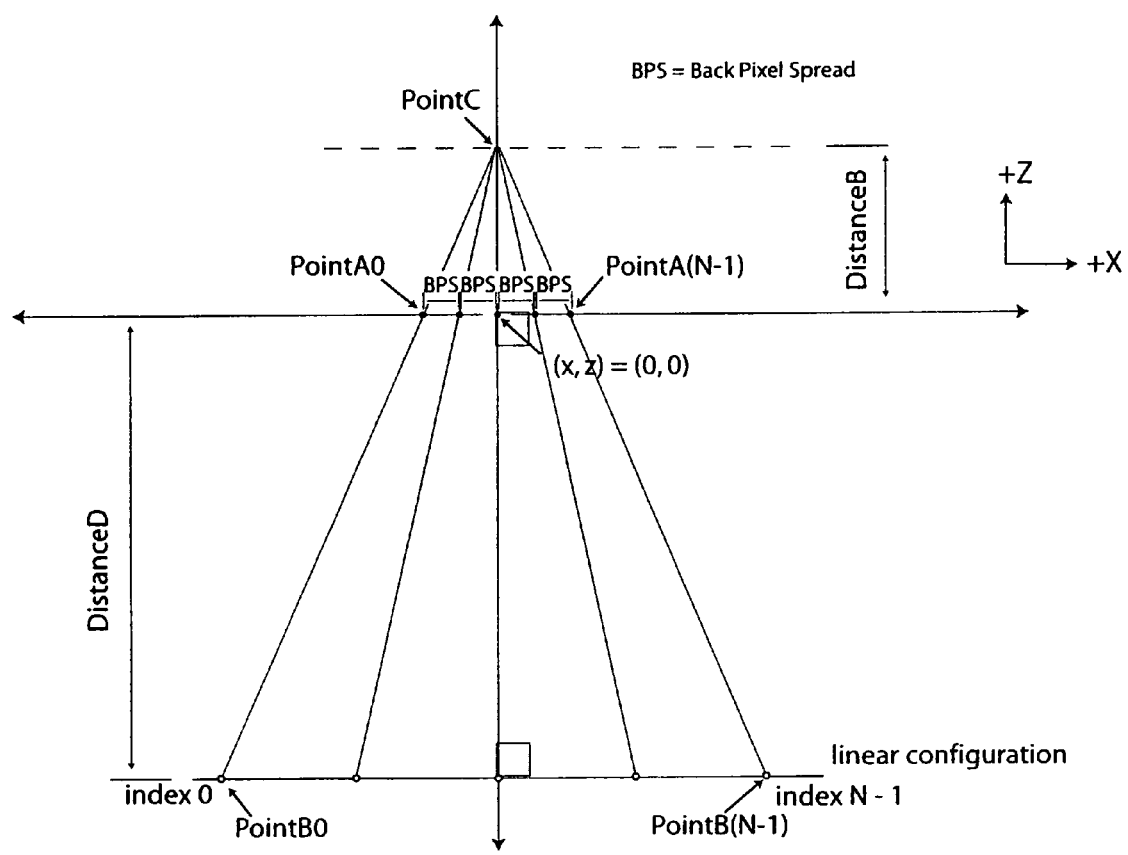
FIGS. 20A and 20B are diagrams used during the fine version of the Exploitation Phase to determine the image acquisition device positions in the case where the back pixel spread has been chosen to be used, and where the number of image acquisition device positions, N, is odd.
Figure 20B:
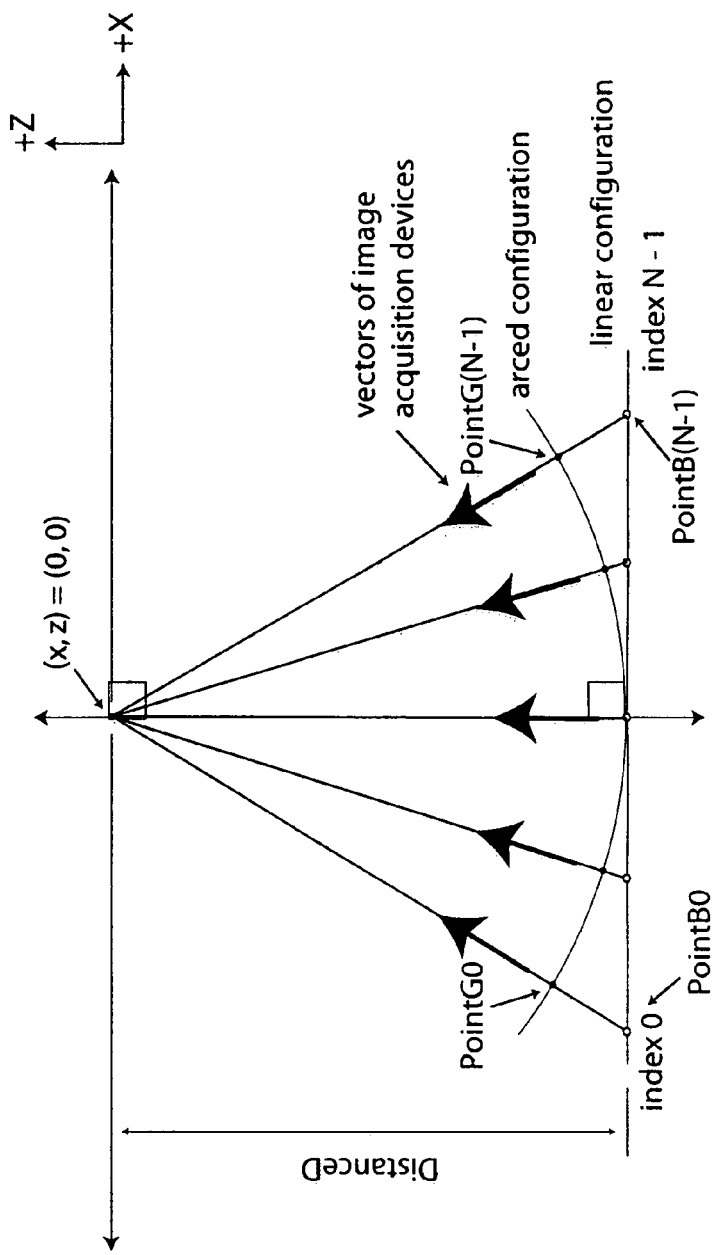

Turning now to the case in which the back pixel spread (BPS) has been selected and the number of image acquisition positions (N) is odd, FIGS. 20A and 20B will be used. Using FIG. 20A first, plot the following known lines (either manually or using graphing software) on an X, Z graph: (i) below the X axis, plot a line at Distance D (in true pixel units from Step S90 of FIG. 15); and (ii) above the X axis, plot a line Distance B (in true pixel units from Step S90 of FIG. 15). In addition, plot the following points on the X axis: Point $A_0$ through Point $A_{(N-1)}$, where N is the number of image acquisition devices, and where the distances between Point $A_0$ and the next adjacent Point A (such as $A_1$) is the front pixel spread (in true pixel units from Step S90 of FIG. 15) as shown in FIG. 18A. Finally, plot Point C on the Z axis at the Distance B line. Of course, these points and lines just described could be graphed in any order.

Next, while still referring to FIG. 20A, and after each Point A has been plotted (until reaching Point $A_{(N-1)}$), create a line from Point C through each Point A that extends to the Distance D line. Sequentially label these points as Point $B_0$, Point $B_1$, etc., through Point $B_{(N-1)}$, as indicated in FIG. 20A.

Next, refer to FIG. 20B, which is another X, Z graph, where a Distance D line has been added, as in FIG. 20A. After inversely scaling the values for Point $B_0$, Point $B_1$, etc., through Point $B_{(N-1)}$, arrived at from FIG. 20A, plot these points as indicated in FIG. 20B. If a linear configuration is desired, Points $B_0$ through $B_{(N-1)}$ are the N positions for the image acquisition devices. In the alternative, if an arced configuration is desired, Points $G_0$ through $G_{(N-1)}$, which represent the positions of the image acquisitions devices in the arced configuration, can be calculated by hand or with graphing software.

Figure 21A:
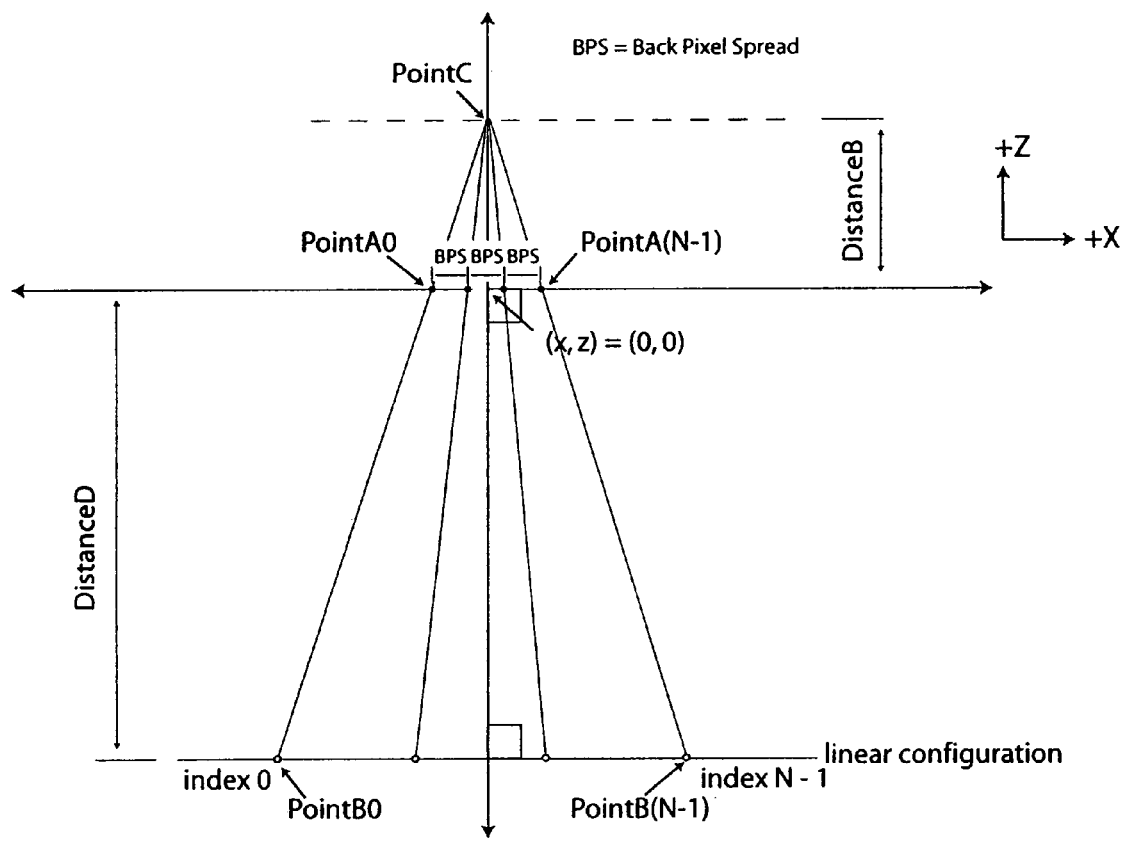
FIGS. 21A and 21B are diagrams used during the fine version of the Exploitation Phase to determine the image acquisition device positions in the case where the back pixel spread has been chosen to be used, and where the number of image acquisition device positions, N, is even.
Figure 21B:
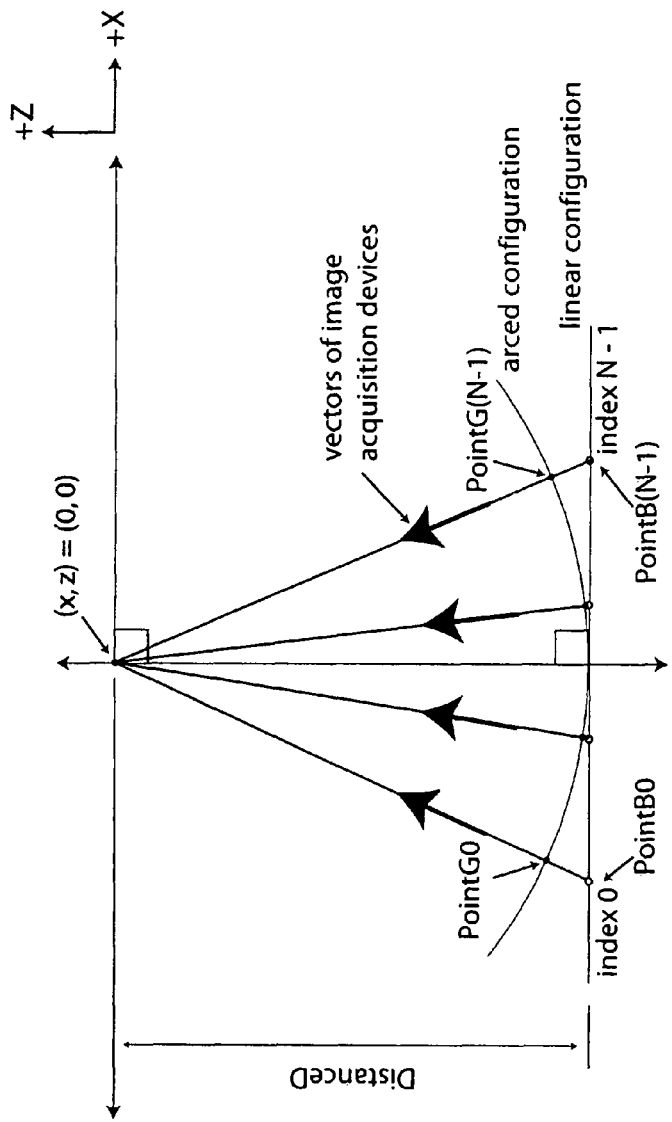

Finally, turning to the case in which the back pixel spread has been chosen and the value of N is even, refer to FIGS. 21A and 21B. As can be seen from comparing FIG. 21A with FIG. 20A and by comparing FIG. 21B with FIG. 20A, the corresponding sets of figures are very similar. The primary difference between FIGS. 21A-B and FIGS. 20A-B is that in FIGS. 20A-B, one value of Point A and one value of Point G will be located on the Z axis, and in FIGS. 21A-B, there are no values of Point A or Point G on the Z axis (the two central values of Point A are at a distance of ½×the Back Pixel Spread to the left or right of the Z axis). This is the case because for an odd number of image acquisition device positions (FIGS. 20A-20B), one of them will be centered in the X direction, and for an even number of device positions, there is no position that is in the center of the other positions. Thus, other than this difference, the image acquisition positions for an even number of positions can be calculated using FIGS. 21A and 21B in essentially the same manner as described above with regard to FIGS. 20A and 20B. Accordingly, further explanation of FIGS. 21A and 21B is unnecessary.

Regardless of which of the previously described methods is used during the Exploitation Phase to arrive at the image acquisition device positioning information, this information is presented to the entity (human or computer) participating in the current Exploitation Phase, who must convert the positioning information back into world units (if not previously converted), using the inverse of the TPperWU conversion factor (Equation 1). It is possible that the entity is a human who will use this positioning information to physically position the image acquisition device(s) (in the given image acquisition device settings state) and acquire the source imagery. It is possible that the entity is a computer graphic software entity which will use this positioning information to position the image acquisition device(s) (in the given image acquisition device settings state) within a computer graphic environment and acquire source imagery.

In the Exploitation Phase of the preceding descriptions of the various embodiments of the invention, which will be called the Device Dependent situation, the user needed to know the pixel dimensions of the source images and the scaling factor that is imposed upon the source images immediately prior to the interleave process, as well as the necessary projective mapping to correct for perspective. However, the Exploitation Phase of the present invention can also be carried out without knowing these parameters, in what will be called the Device Independent situation, as long as the user knows the width of the output image before the application of any projective mapping to correct for perspective (a parameter not required for the Device Dependent situation). This width is to be measured using the same units used to measure the front pixel spread and the back pixel spread, which are also the units used to express the native resolution of the output device and the related output device settings. Of course, the Exploitation Phase of the present invention can be carried out under either the Device Dependent situation or the Device independent situation, depending upon which parameters are known.

FIGS. 22A-22B, 23 and 24 will be used to explain the Standard Version of the Exploitation Phase in the Device Independent situation. The Fine Version of determining image acquisition device positioning information in a Device Independent situation deviates from the Fine Version of the Device Dependent situation in the same fashion in which the Standard Version of determining image acquisition device positioning in a Device Independent situation deviates from the Standard Version of the Device Dependent Situation. Thus, the Fine Version of the Device Independent situation will not be further discussed because one of ordinary skill in the art can readily determine such version upon a review of the Fine Version in the Device Dependent situation, the Standard Version in the Device Dependent situation and the Standard Version in the Device Independent situation.

As with the Device Dependent situation for the Standard Version of the Exploitation Phase, the Device Independent situation of this Phase can also be performed by directly computing the computed angle or by indirectly computing the computed angle. As with the Device Dependent situation, the computed angle is the angle that is central to any two adjacent image acquisition device positions. Once again, this computed angle will theoretically maximize the usage of the illusory three-dimensional depth properties of the conglomeration being used to produce the autostereoscopic image using the values given. In actual usage in the Device Independent situation, as with the Device Dependent situation, any angle equal to or less than this computed angle can be used determine the image acquisition device positions to guarantee that all the visual elements of the scene will properly resolve. However, once again, angles closer in value to the computed angle will provide for a more pronounced illusory three-dimensional effect than those that are far less in value.

Many of the steps of the Standard Version of the Exploitation Phase in the Device Independent situation are the same as those of the Standard Version of the Exploitation Phase in the Device Dependent situation, explained earlier, and accordingly those processes will not be explained again. More specifically, the Standard Version of the Exploitation Phase in the Device Independent situation is the same as that of the device Dependent situation up to and including Step S80 of FIG. 15, so these steps will not be explained again.

In the Device Independent situation, after completing Step S80 of FIG. 15, the values from these steps (Actual Z of Step S60, Distance F from Step S70, and Distance B from Step S80) should not be converting into true pixel units, but instead should be maintained in their natural format, and no scaling factor is to be applied. The next step, whether using the direct computation method or the indirect computation method, is to determine the horizontal field of view angle (HFOV), which is the horizontal angle of the frustum of the image acquisition device in the desired image acquisition device settings state to be used during actual image acquisition.

Figure 22A:
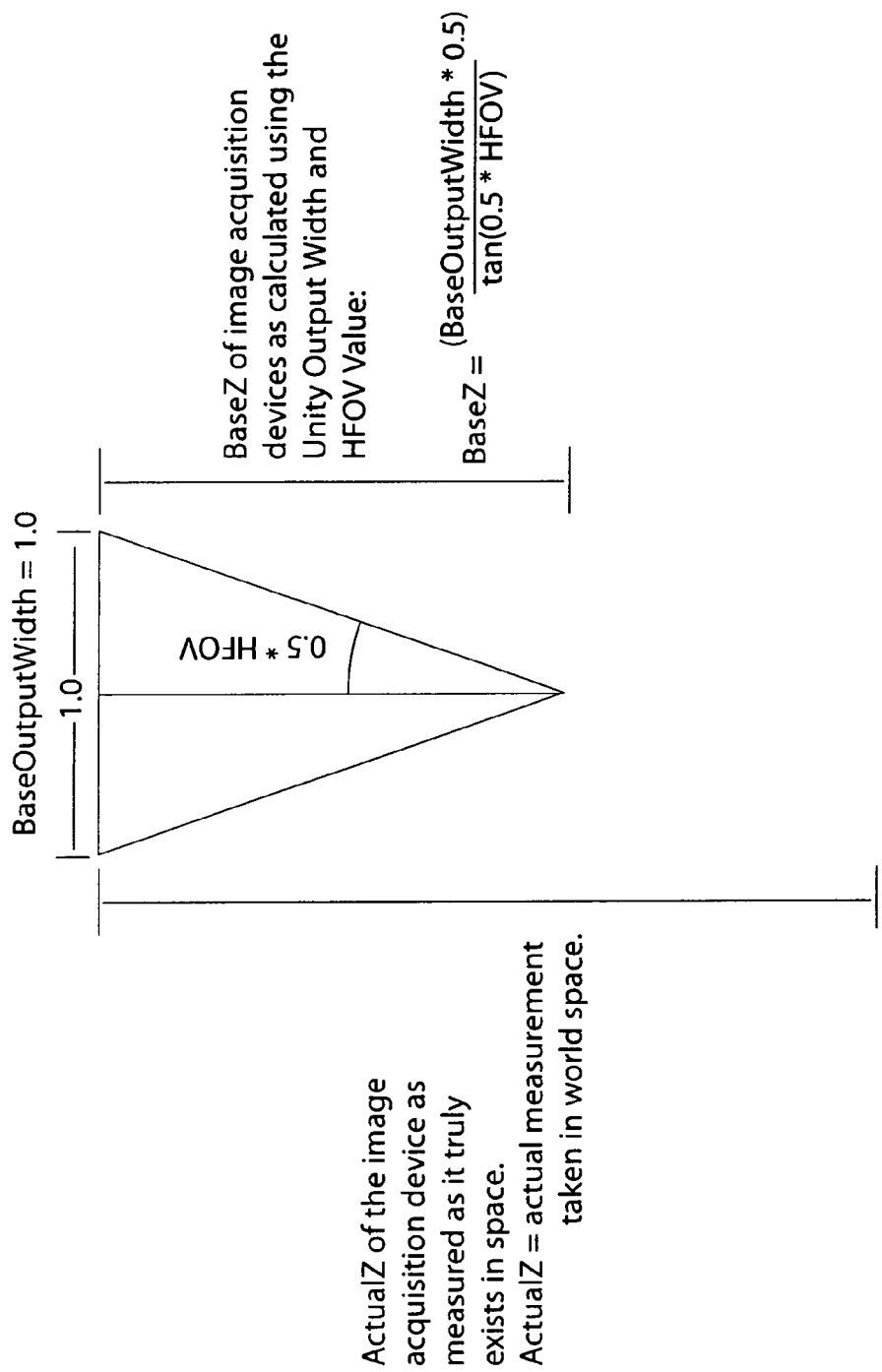
FIGS. 22A and 22B are diagrams used to explain various concepts of the Exploitation Phase in the Device Independent situation.
Figure 22B:
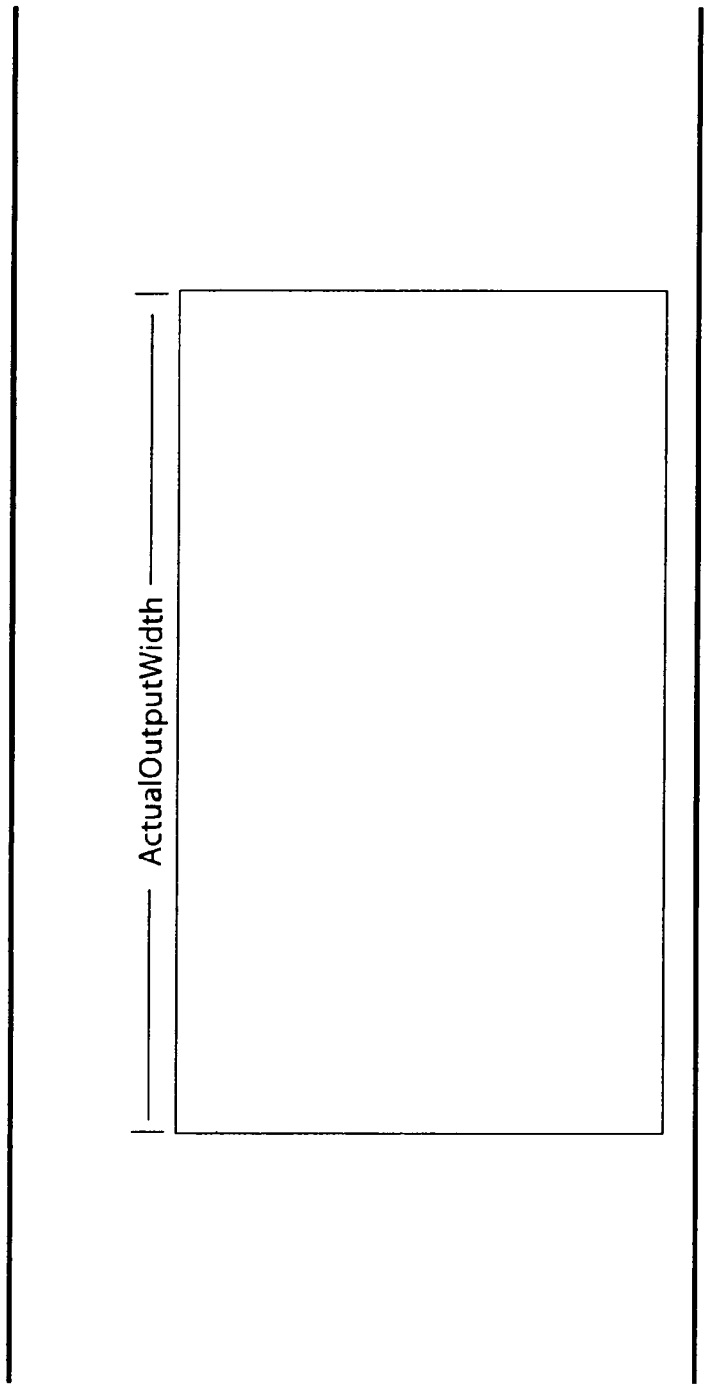

Turning now to FIGS. 22A and 22B, a description of how to arrive at a value called the Temporary Scaling Factor (TempSF) will be provided. The following values, which are represented in FIGS. 22A and 22B (unless otherwise noted), will be used determine the TempSF: (i) the HFOV, which was described in the previous paragraph (not shown); (ii) the BaseOutputWidth, which is always the value 1.0; (iii) the ActualOutputWidth, which is the width to which the source images will be sized immediately prior to interleave (as well as prior to any projective mapping to be applied to correct for perspective); (iv) ActualZ, which is the measurement of Step S60 of FIG. 15 (expressed in its natural format); (v) BaseZ, which is calculated using the expression: BaseZ=(BaseOutputWidth*0.5)/tan (0.5*HFOV).

Using the values for the HFOV, the BaseOutputWidth, the ActualOutputWidth, the ActualZ, and the BaseZ, just described, the value for the TempSF can be calculated using the following equation:

$$TempSF=(ActualZ/BaseZ)*(BaseOutputWidth/ActualOutputWidth) \quad \text{(Equation 2)}$$

Next, while referring to FIG. 23, the direct method of determining the computed angle, in the Device Independent situation, will be described. It should be noted that the Device Independent direct method of FIG. 23 is essentially the same as the Device Dependent direct method of FIG. 16, described earlier, except that the x coordinates of Points B and C are multiplied by the value TempSF, and all of the values plotted are in their natural format (i.e., the values are not converted into true pixel units and no scaling factor (other than TempSF) is applied).

Briefly, using the X-Z coordinates of FIG. 23, Points A, B, C and D can be plotted (in any order) from known values, as described below, Points E and F and angles A1 and A2 can be calculated. Angles A1 and A2 are two versions of the "computed angle" mentioned above, where the final computed angle is the lesser of angles A1 and A2.

More specifically, plot Point A on the Z axis at Distance B (from Step S80 of FIG. 15, with the value maintained in natural format). Plot Point D on the X axis at Distance F (from Step S70 of FIG. 15, with the value maintained in natural format). It should be noted that when used as a Z-axis coordinate, Distance F is a negative value.

Figure 23:
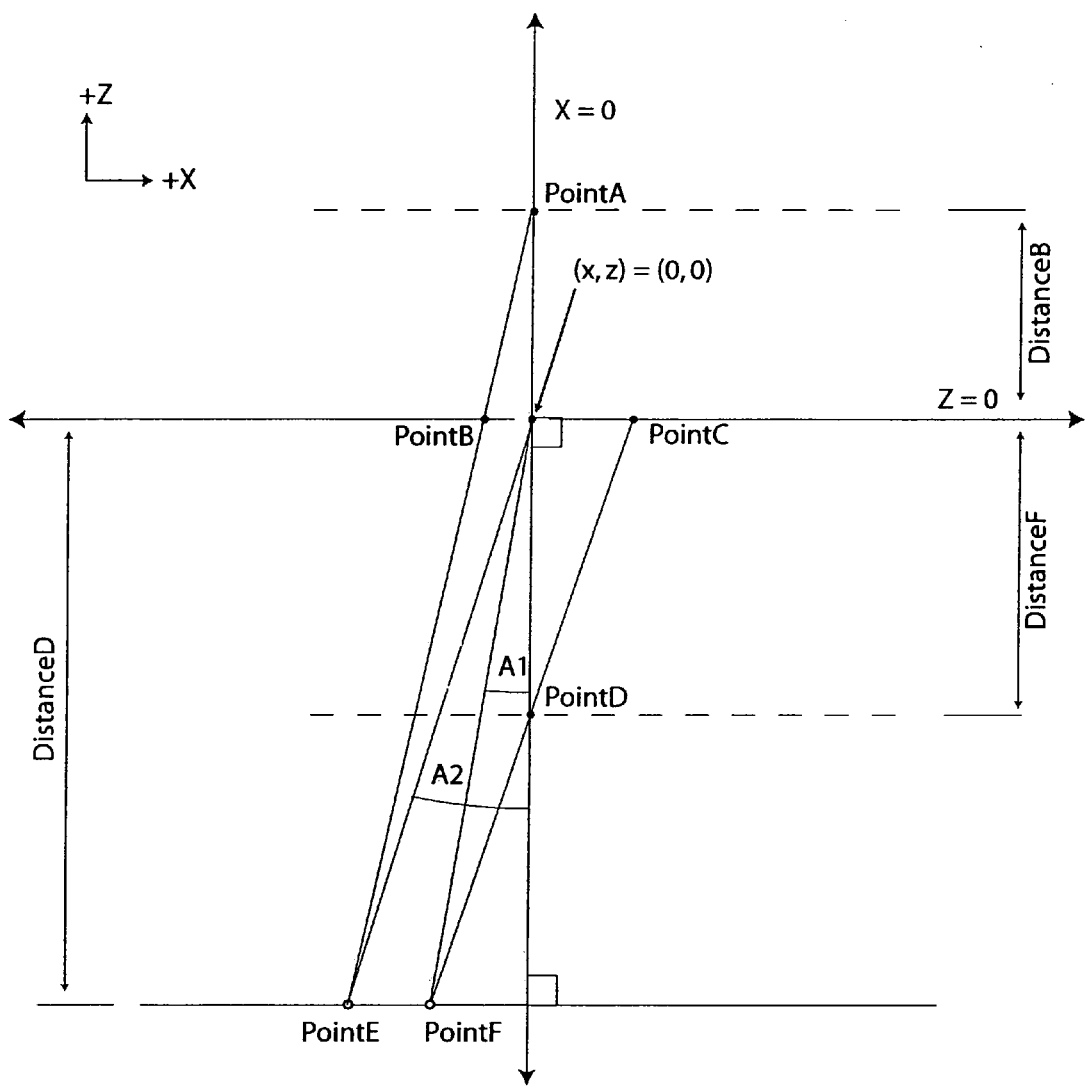
FIG. 23 is a diagram used during the direct standard and direct fine versions of the Exploitation Phase, in the Device Independent situation, for determining a potential central angle used for image acquisition device positioning.

As indicated in FIG. 23, Points B and C are both located on the X axis (i.e., with 0 as their Z coordinates). However, the x positions of Points B and C depend upon whether N (the number of image acquisition devices) is odd or even. If N is an odd number, the X coordinate of Point B is the negative absolute value of the back pixel spread (BPS) multiplied by the value TempSF, and the X coordinate of Point C is the absolute value of the front pixel spread (FPS) multiplied by the value TempSF, where both the BPS and the FPS are maintained in natural format. On the other hand, if N is an even number, the X coordinate of Point B is one half of the negative absolute value of the back pixel spread (BPS) multiplied by the value TempSF, and the X coordinate of Point C is one half of the absolute value of the front pixel spread (FPS) multiplied by the value TempSF, where, once again, both the BPS and the FPS are maintained in natural format.

As with FIG. 16, once again use Points A, B, C and D of FIG. 23, and graphing software or routine geometric calculations, determine the locations of Points E and F, and angles A1 and A2. More specifically, plot Point E by creating a line between Point A and Point B and find the intersection of this line with the line Z=Distance D. Next, plot Point E by creating a line between Point C and Point D and find the intersection of this line with the line Z=Distance D (noting that, in FIG. 16, when used as a coordinate, Distance D is a negative value).

Next, using Point E, the origin (0, 0) and Distance D, trigonometrically determine the measure of angle A2. For example, the following formula may be used: $A2=Tan^{-1}(X_E/|Distance\ D|)$. Using Point F, the origin (0,0) and Distance D, trigonometrically determine the measure of angle A1. For example, the following formula may be used: $A1=Tan^{-1}(X_F/|Distance\ F|)$.

With this direct method of computation, the "computed angle" between any two image acquisition device positions is the lesser of the two angles A1 and A2, noting that if the number of image acquisition device positions, N, is even, this "computed angle" must be multiplied by 2 before being used in any subsequent image acquisition device position calculations.

As with the Device Dependent Methods described earlier, the calculated image acquisition device positioning information is determined using either FIG. 9A or FIG. 9B, and this information is presented to the entity participating in the current Exploitation Phase. However, in the Device Independent Situation, the units need not be converted from the pixel units to world units because they are already in world units.

Next, while referring to FIG. 24, the indirect method of determining the computed angle, in the Device Independent situation, will be described. It should be noted that the Device Independent direct method of FIG. 24 is essentially the same as the Device Dependent direct method of FIG. 17, described earlier, except that the x coordinates of Points B and C are multiplied by the value TempSF, and all of the values plotted are in their natural format (i.e., the values are not converted into true pixel units and no scaling factor is applied).

Figure 24:
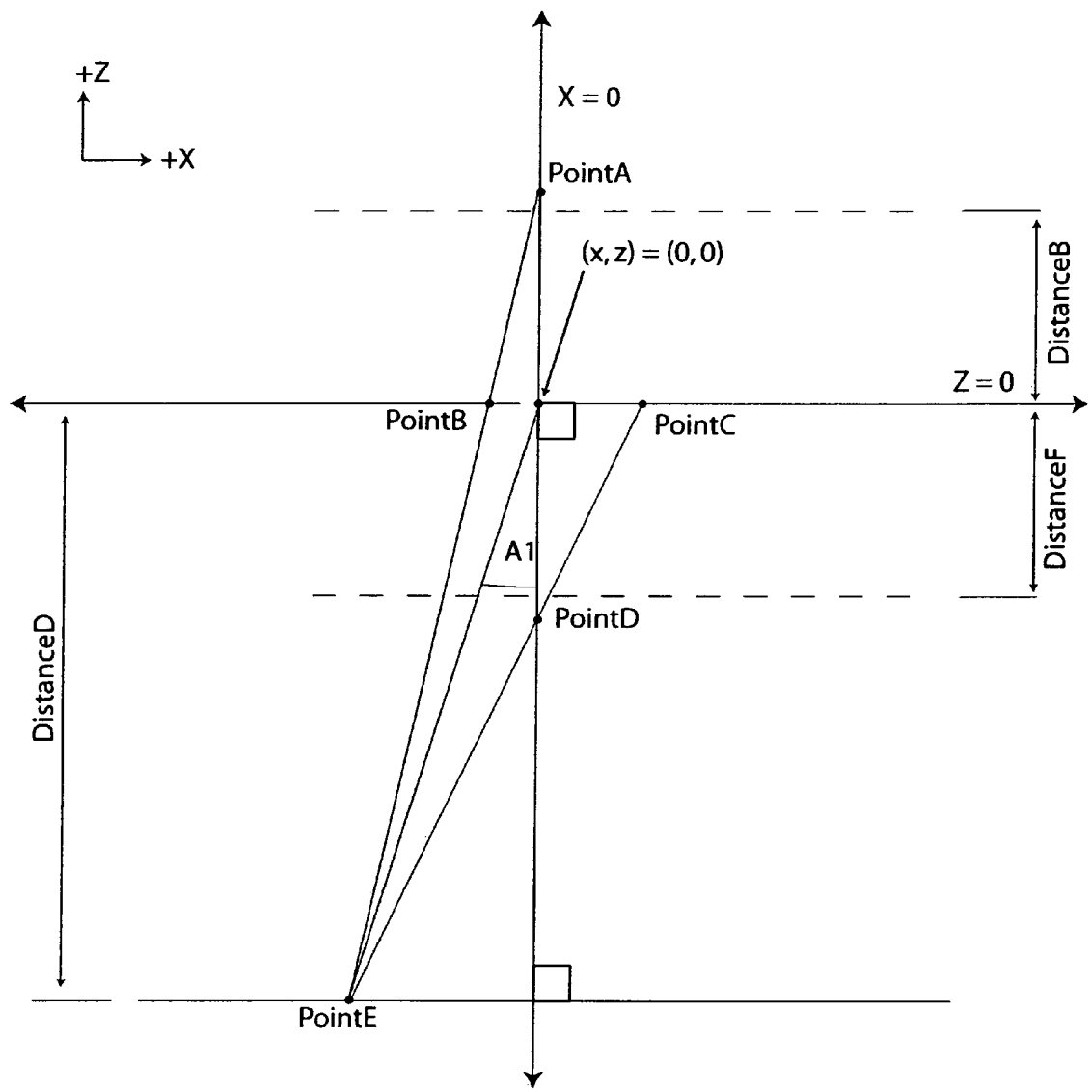
FIG. 24 is a diagram used during the indirect standard version of the Exploitation Phase, in the Device Independent situation, for determining a potential central angle used for image acquisition device positioning.

Referring now to FIG. 24, the indirect method of determining the computed angle, in the Device Independent situation, will be described. Briefly, as with the indirect method of the Device Dependent situation of FIG. 17, this method for the Device Independent situation uses the X-Z coordinates of FIG. 23, Points B and C are plotted (in any order) from known values, as described below, and angle A1 is estimated, then Point E is plotted using trigonometry and the estimated angle A1. Points A and D are determined using common graphing techniques and/or trigonometry. The Z coordinate of Point A is compared to Distance B (Step S80 of FIG. 15) and the Z coordinate of Point D is compared to Distance F (Step S70 of FIG. 15). If one of the following is true, the computed angle is determined to be angle A1: (i) the Z coordinate of Point A is equal to Distance B and the Z coordinate of Point D is greater than or equal to Distance F; or (ii) if the Z coordinate of Point D is equal to distance F and the Z coordinate of Point A is less than or equal to Distance B. However, if neither (i) nor (ii) above is true, the estimate of the angle A1 is adjusted, and the process is repeated until either condition (i) or condition (ii) is true.

A fuller description of the indirect method of determining the computed angle, in the Device Independent situation, will now be described, while referring to FIG. 24.

Distance D, Distance B and Distance F, which are known values determined during the process of FIG. 15, are plotted along the Z axis of the X-Z coordinates, as shown in FIG. 24 (without being converted into true pixel units or including a scaling factor). Point B is plotted as follows: Point B is plotted on the X axis at the coordinate X=the negative absolute value of the back pixel spread times the value TempSF if N is an odd value, and if N is an even value, the same value is multiplied by ½. In a similar fashion, Point C is plotted on the X axis at the coordinate X=the absolute value of the front pixel spread times the value TempSF if N is an odd value, and if N is an even value, the same value is multiplied by ½. Next, an estimate of angle A1 of between 0° and 180° is selected.

With the locations of Points B and C and the estimated value of angle A1, the following steps are performed, either by hand or using graphing software. Using the origin (0, 0), Distance D and angle A1, trigonometrically determine Point E. Using Point E and Point B, formulate and solve the necessary elementary mathematical equations to determine the point of intersection between the line formed between Point E and Point B and the line X=0, calling the point of intersection Point A.

For example, the following calculations may be performed (where $X_A$, $Z_A$ are the coordinates of Point A; $X_B$, $Z_B$, are the coordinates of Point B; $X_C$, $Z_C$ are the coordinates of Point C; $X_D$, $Z_D$ are the coordinates of Point D; and $X_E$, $Z_E$ are the coordinates of Point E):

$$X_E = \text{Tan}(A1) \times (-|\text{Distance}F|)$$

$$Z_A = (((Z_E - Z_B)/(X_E - X_B)) \times (X_A - X_E)) + Z_E$$

Next, using Point E and Point C, formulate and solve the necessary elementary mathematical equations to determine the point of intersection between the line formed between Point E and Point C and the line X=0, calling the point of intersection Point D. For example, $Z_D = (((Z_E - Z_C)/(X_E - X_C)) \times (X_D - X_E)) + Z_E$.

Compare the Z coordinate of Point A with Distance B (used as a Z coordinate) and also compare the Z coordinate of Point D with Distance F (used as a Z coordinate). Paying note to the sign of the values, it is the intention of this step to either have: (i) the Z coordinate of Point A be equal to Distance B (used as a Z coordinate) and the Z coordinate of Point D be greater than or equal to Distance F (used as a Z coordinate); or (ii) the Z coordinate of Point D be equal to Distance F (used as a Z coordinate) and the Z coordinate of Point A be less than or equal to Distance B (used as a Z coordinate). If neither of these cases (i) or (ii) are satisfied, rerun this immediate step with an adjusted value for angle A1 (with all other known values being the same) and continue this process, with different values for angle A1, until either case (i) or case (ii) is satisfied.

Once a value for A1 is determined such that the outcome satisfies either case (i) or case (ii); use this value of A1 as the "computed angle" in further steps, if N (the number of image acquisition devices) is an odd value. If N is an even value, this computed angle must be multiplied by two (2), before it can be used in any subsequent image acquisition device position calculations.

Next, determine if the "computed angle" (already multiplied by two, if N is even), which would provide for a theoretical maximization of illusory space, is to be used as the "central angle" in the actual computation of the image acquisition device positions, or if an angle of lesser value providing for a less than maximized usage of the illusory three-dimensional depth properties is to be used as the central angle in the calculations determining the image acquisition device positions.

As with the Device Dependent situation for the Standard version, and regardless of whether the indirect method or the direct method of arriving at the central angle is used in the Device Independent Situation, FIGS. 9A and 9B are once again used to determine the N different positions of the image acquisition devices to be sued in the Exploitation Phase. Since this portion of the process for the Device Independent Situation is exactly the same as it is for the Device Dependent situation, the description will not be repeated, and the user is directed to the earlier description of the process related to FIGS. 9A and 9B. One of the intentions of the present invention, as previously described, is that the image acquisition device positioning information calculated and then presented to the entity participating in the Exploitation Phase is used to position the image acquisition device selected (or a group of similar such devices) using identical image acquisition device settings to capture source images to be used to create the interleaved subject image data file that, along with the conglomeration chosen, is used to generate the desired autostereoscopic image for which this process has occurred.

In a particularly advantageous usage of the present invention, once the Discovery Phase has been completed for a given conglomeration, an entity (such as a photographer or digital artist) can participate in an Exploitation Phase for the purpose of acquiring source images to be used in the creation of an autostereoscopic image using the conglomeration, knowing nothing more regarding the conglomeration than the following values: the native resolution, the value for the front pixel spread, the value for the back pixel spread and the value N. With such a use of the present invention, the entity participating in the Exploitation Phase does not necessarily participate in the Discovery Phase in any capacity. An example of this use is a service bureau (who participates in the Discovery Phase) that tests conglomerations to be used to produce autostereoscopic images by way of using software, of which this invention as a component, with the intent of providing output services for photographers, or other users (who participate in the Exploitation Phase), who know very little regarding the actual production of an autostereoscopic image. Regarding such photographers, or other users, who are using the same or similar software (of which this invention as a component), who wish to generate source imagery for the purpose having a service bureau produce an autostereoscopic image, the only information these photographers, or other users, would need from the service bureau are the following values: the native resolution, the value for the front pixel spread, the value for the back pixel spread and the value N. In this usage, the photographer, or other user, uses the calculated and presented information to position the image acquisition device(s) and acquire the source imagery necessary to generate the desired autostereoscopic image.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims. Further, various aspects of the present invention are preferably performed with the aid of a computer. It should be obvious to one of ordinary skill in the art that the steps required to perform the various described methods can be stored, in the form of a computer program, in any form of computer memory, such as being recorded into the computer's hard disk drive or being recorded on a recording medium, such as a magnetic or optical disk.

Various features of the invention are set forth in the appended claims.

What is claimed is:

1. A method of creating an autostereoscopic image comprising the steps of:
    determining a value of a front pixel spread;
    determining a value of a back pixel spread;
    determining N different positions for an image acquisition device, or devices, based, at least in part, on said values of said front pixel spread and said back pixel spread;
    acquiring N source images using said image acquisition device, or devices, positioned at said N different positions; and
    interleaving said N source images to create an autostereoscopic image, wherein at least one of said step of determining a value of said front pixel spread and/or said step of determining a value of said back pixel spread includes the following:
    determining angle A1 based on the following formula: A1=M/N−1, where M is a value between 0° and 180° and N is the number of different positions for the image acquisition device or devices;
    determining an arbitrary Z measurement;
    determining an arbitrary starting estimate of the pixel spread;
    calculating a Z axis position of a testing artifact based on N, the current estimate of the pixel spread, the arbitrary Z measurement, and angle A1;
    determining the N different positions of the one or more image acquisition devices based on N, angle A1 and the current calculated Z axis position of the testing artifact;
    creating a test autostereoscopic image of a testing artifact positioned at the current calculated Z axis position with one or more image acquisition devices at the determined N different positions;
    judging whether the current test autostereoscopic image resolved properly, wherein:
        if the current test autostereoscopic image resolved properly, the current estimate of the pixel spread is increased, and the process repeats the steps of calculating a Z axis position, determining the N different positions, creating a test autostereoscopic image, and judging the current auto stereoscopic image;
        if the current test autostereoscopic image did not resolve properly, recollecting whether the previous autostereoscopic image resolved properly, and further wherein if the previous autostereoscopic image resolved properly, ending the method and relying on the associated previous estimate of the pixel spread as the final pixel spread, but if the previous autostereoscopic image did no resolve properly, the current estimate of the pixel spread is decreased, and the process repeats the steps of calculating a Z axis position, determining the N different positions, creating a test autostereoscopic image, and judging the current autostereoscopic image; and
    conveying to a user the final pixel spread from the judging step.

2. The method according to claim 1, wherein said step of determining N different positions for at least one image acquisition device comprises the steps of:
    receiving a value of said front pixel spread;
    receiving a value of said back pixel spread;
    positioning a single one of said image acquisition devices to compose overall scene;
    measuring distance D of vector from point of frustum convergence of said image acquisition device to Z=0 plane;
    measuring distance F from Z=0 plane to front bound of illusory space; and
    measuring distance B from Z=0 plane to back bound of illusory space;
    calculating a central angle between positions of image acquisition devices, relative to point of intersection of said vector from said point of frustum convergence to said Z=0 plane, using distance D, distance F and distance B;
    wherein said step of determining N different positions for said image acquisition device, or devices, is based on either said calculated central angle or an angle of lesser value than said calculated central angle.

3. The method according to claim 2, wherein said N different positions are arranged in an arced configuration.

4. The method according to claim 2, wherein said N different positions are arranged in a linear configuration.

5. The method according to claim 2, further comprising the steps of:
    determining a temporary scaling factor (TempSF) based on the following formula: TempSF=(Distance D/Base Z)*(BaseOutputWidth/ActualOutputWidth), where Base Z=(BaseOutputWidth*0.5)/tan(0.5*HFOV); BaseOutputWidth=1.0; HFOV is the horizontal field of view angle of the frustum of the image acquisition device; and ActualOutputWidth is the width of source images prior to interleave; and
    using said TempSF during said step of calculating said central angle.

6. A system for creating an autostereoscopic image with optimized perceived three dimensional effect, the system comprising:
    means for determining a value of a front pixel spread;
    means for determining a value of a back pixel spread;

means for determining N different positions for an image acquisition device, or devices, based, at least in part, on said values of said front pixel spread and said back pixel spread;
one or more image acquisition devices for acquiring N source images, wherein said image acquisition device, or devices, are positioned at said N different positions; and
means for interleaving said N source images to create an autostereoscopic image,
wherein said means for determining the N different positions performs the steps of:
receiving the value of said front pixel spread;
receiving the value of said back pixel spread;
positioning one of said single image acquisition devices to compose overall scene;
measuring distance D of vector from point of frustum convergence of said image acquisition device to Z=0 plane;
measuring distance F from Z=0 plane to front bound of illusory space;
measuring distance B from Z=0 plane to back bound of illusory space;
calculating a central angle between positions of the image acquisition devices, relative to point of intersection of said vector from said point of frustum convergence to said Z=0 plane, using distance D, distance F and distance B; and
determining the N different positions for said image acquisition device, or devices, based on either said calculated central angle or an angle of lesser value than said calculated central angle; and
wherein said means for acquiring acquires the N source images; and
wherein said means for interleaving interleaves said N source images to create the autostereoscopic image.

7. The system according to claim 6, wherein either said means for determining the value of the front pixel spread and/or said means for determining the value of the back pixel spread performs the steps of:
determining angle A1 based on the following formula: $A1=M/N-1$, where M is a value between 0° and 180° and N is the number of different positions for the image acquisition devices;
determining an arbitrary Z measurement;
determining an arbitrary starting estimate of the pixel spread;
calculating a Z axis position of a testing artifact based on N, the current estimate of the pixel spread, the arbitrary Z measurement, and angle A1;
determining the N different positions of one or more image acquisition devices based on N, angle A1 and the current calculated Z axis position of the testing artifact;
creating a test autostereoscopic image of a testing artifact positioned at the current calculated Z axis position with one or more image acquisition devices at the determined N different positions;
judging whether the current test autostereoscopic image resolved properly, wherein:
if the current test autostereoscopic image resolved properly, the current estimate of the pixel spread is increased, and the process repeats the steps of calculating a Z axis position, determining the N different positions, creating a test autostereoscopic image, and judging the current autostereoscopic image;
if the current test autostereoscopic image did not resolve properly, recollecting whether the previous autostereoscopic image resolved properly, and further wherein if the previous autostereoscopic image resolved properly, ending the method and relying on the associated previous estimate of the pixel spread as the final pixel spread, but if the previous autostereoscopic image did no resolve properly, the current estimate of the pixel spread is decreased, and the process repeats the steps of calculating a Z axis position, determining the N different positions, creating a test autostereoscopic image, and judging the current autostereoscopic image; and
conveying to a user the final pixel spread from the judging step.

8. The system according to claim 7, wherein the value M is the viewing angle of either a lenticular screen or a parallax barrier used in the test auto stereoscopic image.

9. The system according to claim 7, wherein said conveying step includes displaying the final pixel spread on a computer screen.

10. The system according to claim 7, wherein said conveying step includes storing the final pixel spread in a computer memory.

11. The system according to claim 6, wherein either said means for determining the value of the front pixel spread and/or said means for determining the value of the back pixel spread performs the steps of:
creating a blank image data file;
generating a binary mask of pixel dimensions corresponding to said blank image data file;
generating a testing artifact;
determining an arbitrary starting estimate of the pixel spread;
passing said testing artifact through a plurality of predetermined passing sections of said binary mask, and storing resulting image data in said image data file;
horizontally shifting said predetermined passing sections of said binary mask one index value;
horizontally shifting said testing artifact, relative to said binary mask, by an amount equal to said one index value multiplied by the current estimate of the pixel spread;
passing said testing artifact through the current predetermined passing sections of said binary mask, and storing said resulting image data in said image data file;
judging whether all of said index values have acted as a predetermined passing section, and if not, repeating said steps of horizontally shifting said predetermined passing sections, horizontally shifting said testing artifact, and passing said testing artifact until all of said index values have acted as a predetermined passing section;
creating a test autostereoscopic image of said testing artifact from said plurality of resulting stored image data in said image data file;
judging whether the current test autostereoscopic image resolved properly, wherein:
if the current test autostereoscopic image resolved properly, the current estimate of the pixel spread is increased, and the process repeats the steps of passing said testing artifact, horizontally shifting said predetermined passing sections, horizontally shifting said testing artifact, and passing said testing artifact until all of said index values have acted as a predetermined passing section;
if the current test autostereoscopic image did not resolve properly, recollecting whether the previous autostereoscopic image resolved properly, and further wherein if the previous autostereoscopic image resolved properly, ending the method and relying on the associated previous estimate of the pixel spread as the final pixel spread, but if the previous autostereoscopic image did no resolve properly, the current estimate of the pixel spread is decreased, and the process repeats the steps of passing said testing artifact, horizontally shifting said predetermined passing sections, horizontally shifting said testing artifact, and passing said testing artifact until all of said index values have acted as a predetermined passing section; and conveying to a user the final pixel spread from the judging step.

12. The system according to claim 11, wherein when said pixel spread is a front pixel spread, and said step of horizontally shifting said testing artifact comprises a leftward shift.

13. The system according to claim 11, wherein when said pixel spread is a back pixel spread, and said step of horizontally shifting said testing artifact comprises a rightward shift.

14. The system according to claim 6 wherein a single image acquisition device is moved to be positioned at said N different positions.

15. The system according to claim 6, comprising a plurality of image acquisition devices, with each of said devices being positioned at one of said N different positions.

16. A non-transitory tangible autostereoscopic image comprising:
  a plurality of interleaved source images, wherein said plurality of source images have been acquired from one or more image acquisition devices positioned at N different positions, where said N different positions have been calculated on the basis of a predetermined front pixel spread and a predetermined back pixel spread; and
  an optical member for creating a three dimensional effect when viewing said plurality of interleaved source images, wherein said optical member is one of a parallax barrier or a lenticular screen, and
  wherein said front pixel spread and said back pixel spread have each been determined by the following:
  creating a blank image data file;
  generating a binary mask of pixel dimensions corresponding to said blank image data file;
  generating a testing artifact;
  determining an arbitrary starting estimate of the pixel spread;
  passing said testing artifact through a plurality of predetermined passing sections of said binary mask, and storing resulting image data in said image data file;
  horizontally shifting said predetermined passing sections of said binary mask one index value;
  horizontally shifting said testing artifact, relative to said binary mask, by an amount equal to said one index value multiplied by the current estimate of the pixel spread;
  passing said testing artifact through the current predetermined passing sections of said binary mask, and storing said resulting image data in said image data file;
  judging whether all of said index values have acted as a predetermined passing section, and if not, repeating said steps of horizontally shifting said predetermined passing sections, horizontally shifting said testing artifact, and passing said testing artifact until all of said index values have acted as a predetermined passing section;
  creating a test autostereoscopic image of said testing artifact from said plurality of resulting stored image data in said image data file;
  judging whether the current test autostereoscopic image resolved properly, wherein:
  if the current test autostereoscopic image resolved properly, the current estimate of the pixel spread is increased, and the process repeats the steps of passing said testing artifact, horizontally shifting said predetermined passing sections, horizontally shifting said testing artifact, and passing said testing artifact until all of said index values have acted as a predetermined passing section;
  if the current test autostereoscopic image did not resolve properly, recollecting whether the previous autostereoscopic image resolved properly, and further wherein if the previous autostereoscopic image resolved properly, ending the method and relying on the associated previous estimate of the pixel spread as the final pixel spread, but if the previous autostereoscopic image did no resolve properly, the current estimate of the pixel spread is decreased, and the process repeats the steps of passing said testing artifact, horizontally shifting said predetermined passing sections, horizontally shifting said testing artifact, and passing said testing artifact until all of said index values have acted as a predetermined passing section; and
  conveying to a user the final pixel spread from the judging step.

* * * * *